(12) United States Patent
Cha et al.

(10) Patent No.: US 9,465,794 B2
(45) Date of Patent: Oct. 11, 2016

(54) TERMINAL AND CONTROL METHOD THEREOF

(75) Inventors: Sun-Hwa Cha, Seoul (KR); Jong-Keun Youn, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 912 days.

(21) Appl. No.: 12/781,008

(22) Filed: May 17, 2010

(65) Prior Publication Data
US 2011/0105190 A1  May 5, 2011

(30) Foreign Application Priority Data
Nov. 5, 2009  (KR) .................. 10-2009-0106602

(51) Int. Cl.
*H04L 12/58* (2006.01)
*H04M 1/725* (2006.01)
(Continued)

(52) U.S. Cl.
CPC ......... *G06F 17/276* (2013.01); *G10L 15/1815* (2013.01); *G10L 15/26* (2013.01); *G10L 2015/088* (2013.01); *H04M 1/72552* (2013.01); *H04M 2250/74* (2013.01)

(58) Field of Classification Search
CPC . H04L 12/581; H04L 12/5835; H04L 51/06; H04L 51/066; H04M 1/56; H04M 1/575; H04M 1/5835; H04M 1/7255; H04M 1/72522; H04M 3/4936; H04M 3/4838; H04M 3/533; H04M 1/2478; H04M 1/6505; H04M 1/72552; H04M 1/72561; H04M 1/72591; H04M 3/42382; H04M 3/5322; H04M 3/4938; H04M 3/53333; H04M 2201/39; H04M 2201/40; H04M 2201/60; H04M 2250/74; H04M 2203/4536; H04M 3/5183; H04M 3/5307; H04M 3/537; H04M 2203/2038; H04M 2203/651; G06F 17/276; G06F 3/167; G06F 3/165; G06F 17/2872; G06F 17/3066; G10L 15/265; G10L 15/22; G10L 15/32; G10L 15/1815; G10L 3/165; G10L 17/2872; G10L 17/3066; H04N 21/4788; H04Q 2213/13375; H04Q 2213/13377; H04Q 2213/13378
USPC ......... 455/412.1, 413, 414.4, 563, 564, 566, 455/466; 370/259, 356, 310; 379/52, 88.03, 379/88.13, 88.14, 88.22, 265.01; 704/8, 704/235, 260, 270, 275; 709/217, 227; 715/207
See application file for complete search history.

(56) References Cited

U.S. PATENT DOCUMENTS 5,899,976 A * 5/1999 Rozak ............... G10L 15/22
                                                 704/250
6,163,765 A * 12/2000 Andric et al. ............... 704/204
(Continued)

FOREIGN PATENT DOCUMENTS

WO  WO 2008/084476 A2   7/2008
WO  WO 2008084207 A1 *  7/2008

*Primary Examiner* — Yuwen Pan
*Assistant Examiner* — Paul P Tran
(74) *Attorney, Agent, or Firm* — Birch, Stewart, Kolasch & Birch, LLP

(57) ABSTRACT

Disclose is a mobile terminal and control method thereof for inputting a voice to automatically generate a message to be sent during conversation using a mobile messenger, and it may include a microphone for inputting a user's voice, a display unit for displaying a mobile messenger; and a controller for inputting and recognizing a user's voice when a mobile messenger is implemented and then converting into a message to display the message on a message input window of the mobile messenger, and sending the displayed message to the other party which has been preset, and displaying the message sent to the other party and a message received from the other party in the sending and receiving order on a send/receive display window of the mobile messenger.

12 Claims, 17 Drawing Sheets

(51) Int. Cl.
| | |
|---|---|
| *H04L 29/08* | (2006.01) |
| *H04M 1/00* | (2006.01) |
| *H04B 1/38* | (2015.01) |
| *H04L 12/16* | (2006.01) |
| *H04Q 11/00* | (2006.01) |
| *H04B 7/00* | (2006.01) |
| *H04M 1/64* | (2006.01) |
| *H04M 11/00* | (2006.01) |
| *G10L 15/26* | (2006.01) |
| *G10L 21/00* | (2013.01) |
| *G10L 25/00* | (2013.01) |
| *G06F 15/16* | (2006.01) |
| *G06F 17/27* | (2006.01) |
| *G10L 15/18* | (2013.01) |
| *G10L 15/08* | (2006.01) |

(56) References Cited

U.S. PATENT DOCUMENTS

| | | | |
|---|---|---|---|
| 6,282,507 B1* | 8/2001 | Horiguchi et al. | 704/3 |
| 6,507,643 B1* | 1/2003 | Groner | 379/88.14 |
| 8,243,888 B2* | 8/2012 | Cho | 379/88.01 |
| 2002/0133347 A1* | 9/2002 | Schoneburg | G06F 17/27 704/257 |
| 2002/0159572 A1* | 10/2002 | Fostick | 379/88.14 |
| 2003/0081739 A1* | 5/2003 | Hikishima | 379/88.01 |
| 2003/0097262 A1* | 5/2003 | Nelson | 704/235 |
| 2004/0002851 A1* | 1/2004 | Simske | 704/9 |
| 2005/0048992 A1* | 3/2005 | Wu et al. | 455/466 |
| 2005/0273327 A1* | 12/2005 | Krishnan | 704/235 |
| 2006/0093099 A1* | 5/2006 | Cho | 379/88.14 |
| 2006/0217159 A1* | 9/2006 | Watson | 455/563 |
| 2007/0208556 A1* | 9/2007 | Kwak et al. | 704/9 |
| 2010/0217591 A1* | 8/2010 | Shpigel | 704/235 |
| 2013/0165086 A1* | 6/2013 | Doulton | 455/414.4 |

\* cited by examiner

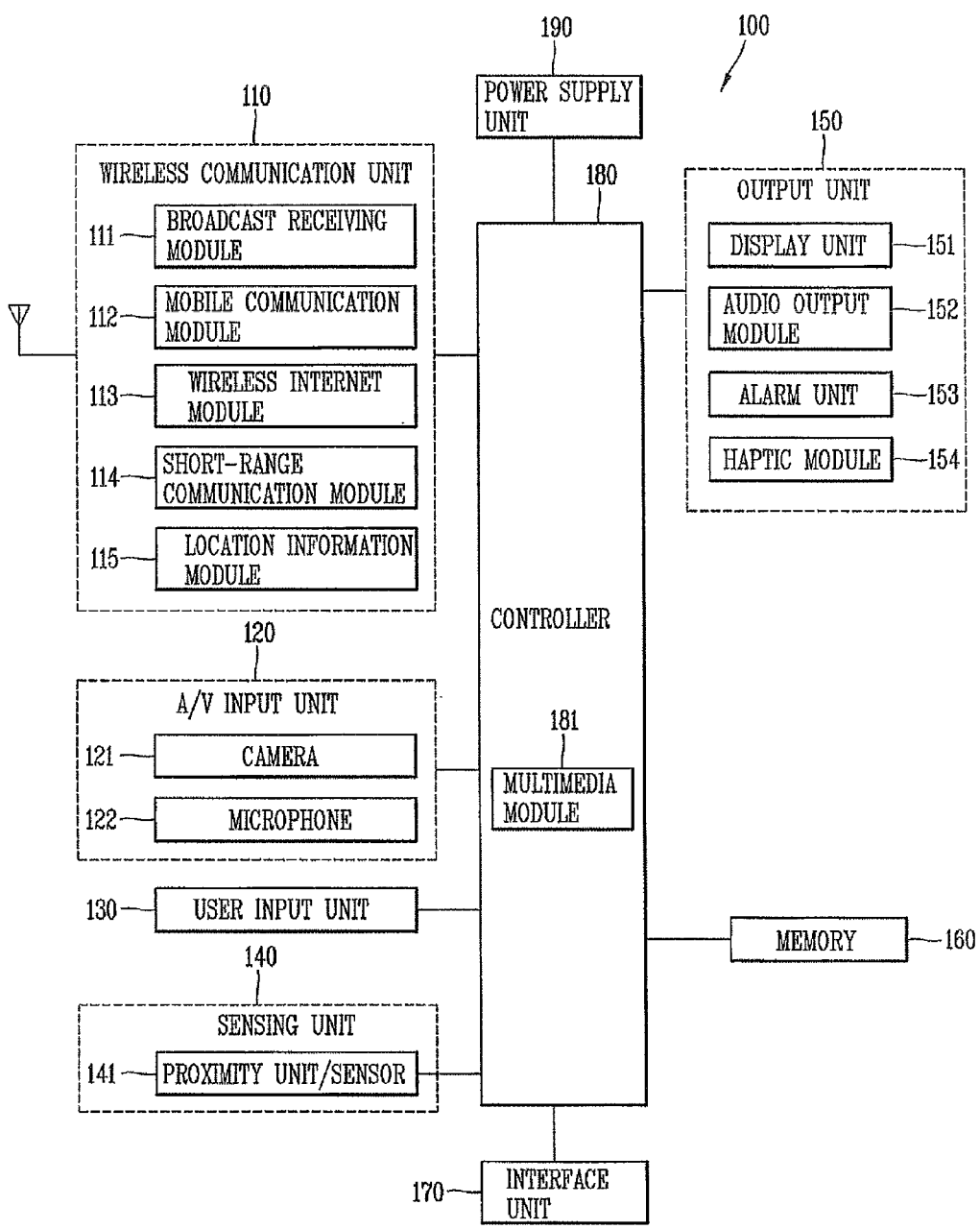

TERMINAL AND CONTROL METHOD THEREOF

RELATED APPLICATION

Pursuant to 35 U.S.C. §119(a), this application claims the benefit of earlier filing date and right of priority to Korean Application No. 10-2009-0106602, filed on Nov. 5, 2009, the contents of which is incorporated by reference herein in its entirety.

BACKGROUND OF THE INVENTION

1. Field of the Invention

The present invention relates to a mobile terminal and control method thereof for inputting a voice to automatically generate a message to be sent during conversation using a mobile messenger.

2. Description of the Related Art

Terminals can be classified into two types, such as a mobile terminal and a stationary terminal based on its mobility. Furthermore, the mobile terminal can be further classified into two types, such as a handheld terminal and a vehicle mount terminal based on whether or not it can be directly carried by a user.

As it becomes multifunctional, furthermore, such a terminal is allowed to capture still images or moving images, play music or video files, play games, receive broadcast and the like, so as to be implemented as an integrated multimedia player. For a functional support and enhancement of the terminal, it may be considered to improve a structural and/or software aspect of the terminal.

In recent years, efforts for applying a voice recognition function to a mobile terminal have carried out. For example, a text message may be provided by using a speech-to-text (STT) function converting voice into text, thereby allowing the user to input a text conveniently. However, there arises a problem that the rate of voice recognition is low because the scope of voice recognition is broad. In other words, there arises a problem that the scope of voice recognition is broad, and the rate of voice recognition is thereby low because the terminal does not know what kind of content to be inputted as a voice.

SUMMARY OF THE INVENTION

The present invention is to provide a mobile terminal and control method thereof for inputting a voice and automatically generating a message to be sent during conversation using a mobile messenger.

Furthermore, the present invention is to provide a mobile terminal and control method thereof for grasping context information from previous conversation content and reflecting it on the voice recognition of the next inputted sentence.

Furthermore, the present invention is to provide a mobile terminal and control method thereof for automatically completing a sentence using grasped context information.

Furthermore, the present invention is to provide a mobile terminal and control method thereof for automatically restricting the scope of voice recognition (i.e., information scope of a particular database for voice recognition) using grasped context information.

Furthermore, the present invention is to provide a mobile terminal and control method thereof for automatically restricting the scope of voice recognition (i.e., information scope of a particular database for voice recognition) using relation information with a group to which the other party belongs or the user.

In order to accomplish the foregoing task, a mobile terminal according to the present invention may include a microphone for inputting a user's voice, a display unit for displaying a mobile messenger, and a controller for inputting and recognizing a user's voice when a mobile messenger is implemented and then converting into a message to display the message on a message input window of the mobile messenger, and sending the displayed message to the other party which has been preset, and displaying the message sent to the other party and a message received from the other party in the sending and receiving order on a send/receive display window of the mobile messenger.

In order to accomplish the foregoing task, a method of controlling a mobile terminal according to the present invention may include the steps of inputting a user's voice when a mobile messenger is implemented, recognizing the inputted user's voice and converting into a message, displaying the message on a message input window of the mobile messenger, sending the message displayed on the message input window to the other party which has been preset, and displaying the message sent to the other party and a message received from the other party in the sending and receiving order on a send/receive display window of the mobile messenger.

A mobile terminal having the foregoing configuration associated with at least one embodiment of the present invention, the rate of voice recognition may be enhanced by grasping context information from previous conversation content and reflecting it on the next sentence to recognize a voice during conversation using a mobile messenger.

Furthermore, the rate of voice recognition may be enhanced by restricting the scope of voice recognition using relation information with a group to which the other party belongs or the user during conversation using a mobile messenger.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a block diagram illustrating a mobile terminal associated with an embodiment of the present invention;

DETAILED DESCRIPTION OF THE INVENTION

Figure 2A:
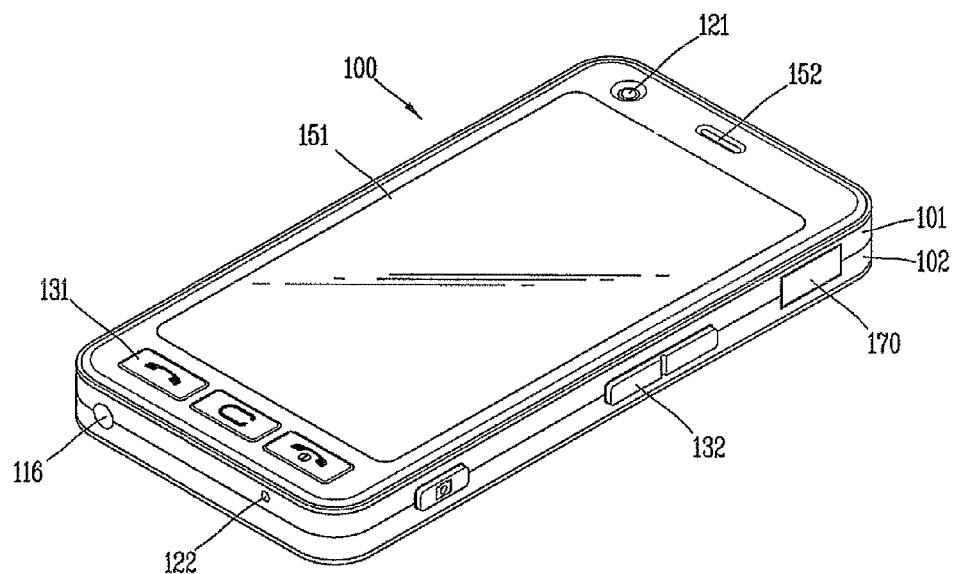
FIG. 2A is a front perspective view illustrating a mobile terminal associated with an embodiment of the present invention.

Hereinafter, a mobile terminal associated with the present invention will be described in more detail with reference to the accompanying drawings. A suffix "module" or "unit" used for constituent elements disclosed in the following description is merely intended for easy description of the specification, and the suffix itself does not give any special meaning or function.

A mobile terminal disclosed herein may include a portable phone, a smart phone, a laptop computer, a digital broadcast terminal, a personal digital assistant (PDA), a portable multimedia player (PMP), a navigation, and the like. However, it would be easily understood by those skilled in the art that a configuration according to the embodiments disclosed herein may be applicable to stationary terminals such as digital TV, desktop computer, and the like, as well as mobile terminals.

FIG. 1 is a block diagram illustrating a mobile terminal associated with an embodiment of the present invention.

The mobile terminal 100 may include a wireless communication unit 110, an Audio/Video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile terminal may be implemented with greater or less number of elements than those illustrated elements.

Hereinafter, the constituent elements will be described in sequence.

The wireless communication unit 110 typically includes one or more elements allowing radio communication between the mobile terminal 100 and a wireless communication system, or allowing radio communication between radio communication the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel.

The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form that a data broadcast signal is combined with the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems.

The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113 means a module for supporting wireless Internet access. The wireless Internet module 113 may be built-in or externally installed to the mobile terminal 100. Here, it may be used a wireless Internet access technique including a WLAN (Wireless LAN), Wi-Fi, Wibro (Wireless Broadband), Wimax (World Interoperability for Microwave Access), HSDPA (High Speed Downlink Packet Access), and the like.

The short-range communication module 114 is a module for supporting a short-range communication. Here, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile terminal, and there is a GPS module as a representative example.

Referring to FIG. 1, the A/V (audio/video) input unit 120 receives an audio or video signal, and the A/V (audio/video) input unit 120 may include a camera 121 and a microphone 122. The camera 121 processes a image frame, such as still picture or video, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed state of the mobile terminal 100, a location of the mobile terminal 100, an orientation of the mobile terminal 100, and the like, and generates a sensing signal for controlling the operation of the mobile terminal 100. For example, when the mobile terminal 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 170. On the other hand, the sensing unit 140 may include a proximity sensor 141.

The output unit 150 is configured to provide an output for audio signal, video signal, or alarm signal, and the output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a terminal body through a region occupied by the display unit 151 of the terminal body.

The display unit 151 may be implemented in two or more in number according to a configured aspect of the portable terminal 100. For instance, a plurality of the display units 151 may be arranged on one surface to be spaced apart from or integrated with each other, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the portable terminal 100 covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the portable terminal 100, e.g., sound alarming a call received or a message received, and so on. The audio output module 152 may include a receiver, a speaker, a buzzer, and so on.

The alarm 153 outputs signals notifying occurrence of events from the portable terminal 100. The events occurring from the portable terminal 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the portable terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the portable terminal with external devices. The interface unit 170 may allow a data reception from an external device, a power delivery to each component in the portable terminal 100, or a data transmission from the portable terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the portable terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the portable terminal 100 via a port.

Also, the interface unit may serve as a path for power to be supplied from an external cradle to the portable terminal 100 when the portable terminal 100 is connected to the external cradle or as a path for transferring various command signals inputted from the cradle by a user to the portable terminal 100. Such various command signals or power inputted from the cradle may operate as signals for recognizing that the portable terminal 100 has accurately been mounted to the cradle.

The controller 180 typically controls the overall operations of the portable terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

FIG. 2a is a front perspective view illustrating an example of a mobile terminal or portable terminal associated with the present invention.

The portable terminal 100 disclosed herein is provided with a bar-type terminal body. However, the present invention is not only limited to this type of terminal, but also applicable to various structures of terminals such as slide type, folder type, swivel type, swing type, and the like, in which two and more bodies are combined with each other in a relatively movable manner.

The terminal body includes a case (casing, housing, cover, etc.) forming an appearance of the terminal. Various electronic components are built in a space formed between the front case 101 and the rear case 102. In this embodiment, the case may be divided into a front case 101 and a rear case 102. At least one middle case may be additionally disposed between the front case 101 and the rear case 102.

The cases may be formed by injection-molding a synthetic resin or may be also formed of a metal material such as stainless steel (STS), titanium (Ti), or the like.

A display unit 151, an audio output module 152, a camera 121, a user input unit 130/131, 132, a microphone 122, an interface 170, and the like may be arranged on the terminal body, mainly on the front case 101.

The display unit 151 occupies a most portion of the front case 101. The audio output unit 152 and the camera 121 are disposed on a region adjacent to one of both ends of the display unit 151, and the user input unit 131 and the microphone 122 are disposed on a region adjacent to the other end thereof. The user interface 132 and the interface 170, and the like, may be disposed on a lateral surface of the front case 101 and the rear case 102.

The user input unit 130 is manipulated to receive a command for controlling the operation of the portable terminal 100, and may include a plurality of manipulation units 131, 132. The manipulation units 131, 132 may be commonly designated as a manipulating portion, and any method may be employed if it is a tactile manner allowing the user to perform manipulation with a tactile feeling.

The content inputted by the manipulation units 131, 132 may be set in various ways. For example, the first manipulation unit 131 may be used to receive a command, such as start, end, scroll, 3D browser execution, or the like, and the second manipulation unit 132 may be used to receive a command, such as controlling a volume level being outputted from the audio output unit 152, or switching it into a touch recognition mode of the display unit 151.

Figure 2B:
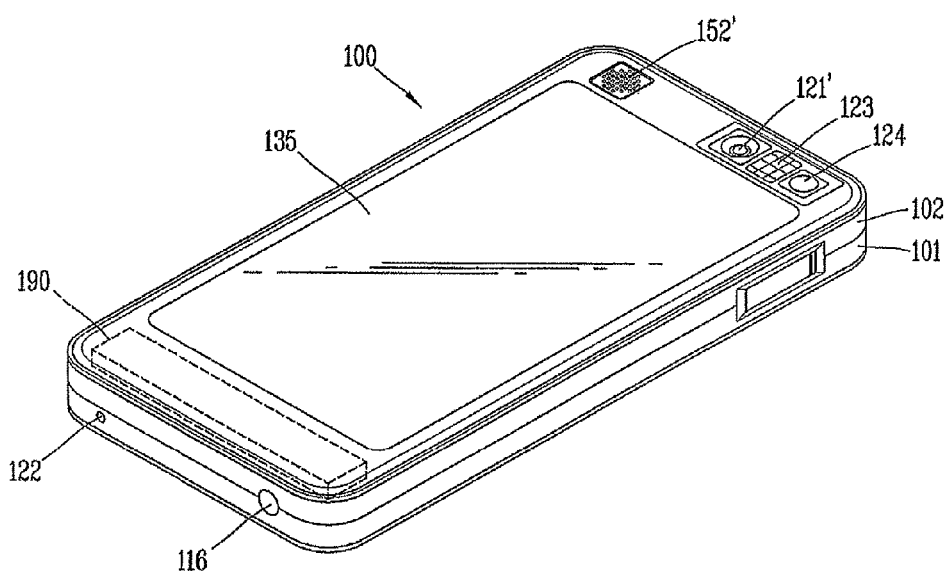
FIG. 2B is a rear perspective view illustrating a mobile terminal associated with an embodiment of the present invention.

FIG. 2b is a rear perspective view illustrating a portable terminal of FIG. 2a.

Referring to FIG. 2b, a camera 121' may be additionally mounted on a rear surface of the terminal body, namely, the rear case 102. The camera 121' has an image capturing direction, which is substantially opposite to the direction of the camera 121 (refer to FIG. 2a), and may have different pixels from those of the first video input unit 121.

For example, it is preferable that the camera 121 has a relatively small number of pixels enough not to cause a difficulty when the user captures his or her own face and sends it to the other party during a video call or the like, and the camera 121' has a relatively large number of pixels since the user often captures a general object that is not sent immediately. The cameras 121, 121' may be provided in the terminal body in a rotatable and popupable manner.

Furthermore, a flash 123 and a mirror 124 may be additionally disposed adjacent to the camera 121'. The flash 123 illuminates light toward an object when capturing the object with the camera 121'. The mirror 124 allows the user to look at his or her own face, or the like, in a reflected way when capturing himself or herself (in a self-portrait mode) by using the camera 121'.

Furthermore, an audio output unit 152' may be additionally disposed on a rear surface of the terminal body. The audio output unit 152' together with the audio output unit 152 (refer to FIG. 2a) can implement a stereo function, and it may be also used to implement a speaker phone mode during a phone call.

Furthermore, an antenna 116 for receiving broadcast signals may be additionally disposed on a lateral surface of the terminal body. The antenna 116 constituting a broadcast receiving module 111 (refer to FIG. 1) may be provided so as to be pulled out from the terminal body.

Furthermore, a power supply unit 190 for supplying power to the portable terminal 100 may be mounted on a rear surface of the terminal body. The power supply unit 190 may be configured so as to be incorporated in the terminal body, or directly detachable from the outside of the terminal body.

A touch pad 135 for detecting a touch may be additionally mounted on the rear case 102. The touch pad 135 may be configured in an optical transmission type similarly to the display unit 151. In this case, if the display unit 151 is configured to output visual information from both sides of the display unit 151, then the visual information may be also recognized through the touch pad 135. The information being outputted from the both sides thereof may be controlled by the touch pad 135. In addition, a display may be additionally mounted on the touch pad 135, and a touch screen may be also disposed on the rear case 102.

The touch pad 135 operates in a reciprocal relation to the display unit 151 of the front case 101. The touch pad 135 may be disposed in parallel on a rear side of the display unit 151. The touch pad 135 may have the same or a smaller size as or than that of the display unit 151.

Various kinds of visual information may be displayed on the display unit 151. The visual information may be displayed in a form of characters, numerals, symbols, graphics, or icons. For an input of the visual information, at least one of the characters, numerals, symbols, graphics, or icons may be displayed with a predetermined arrangement so as to be implemented in a form of keypad. Such a keypad may be referred to as a so-called "soft key (or software button)."

Hereinafter, preferred embodiments associated with a control method that can be implemented in a terminal having the foregoing configuration will be described with reference to the accompanying drawings. The following embodiments may be used alone or in combination with one another. Furthermore, the following embodiments may be used in combination with the foregoing user interface (UI).

The mobile terminal according to the embodiment of the present invention includes an algorithm for a voice recognition and an algorithm for an STT (Speech To Text) stored in the memory 160, and a voice inputted by a user can be converted into text by associating an arbitrary function provided in the mobile terminal, the voice recognition function and the STT function. The converted text may be outputted to an execution screen of the function. Here, the particular function may include a function of creating text for a text message or a mail. When the text message or mail creating function is executed, the controller 180 may activate the voice recognition function and automatically operate the STT function.

Figure 3:
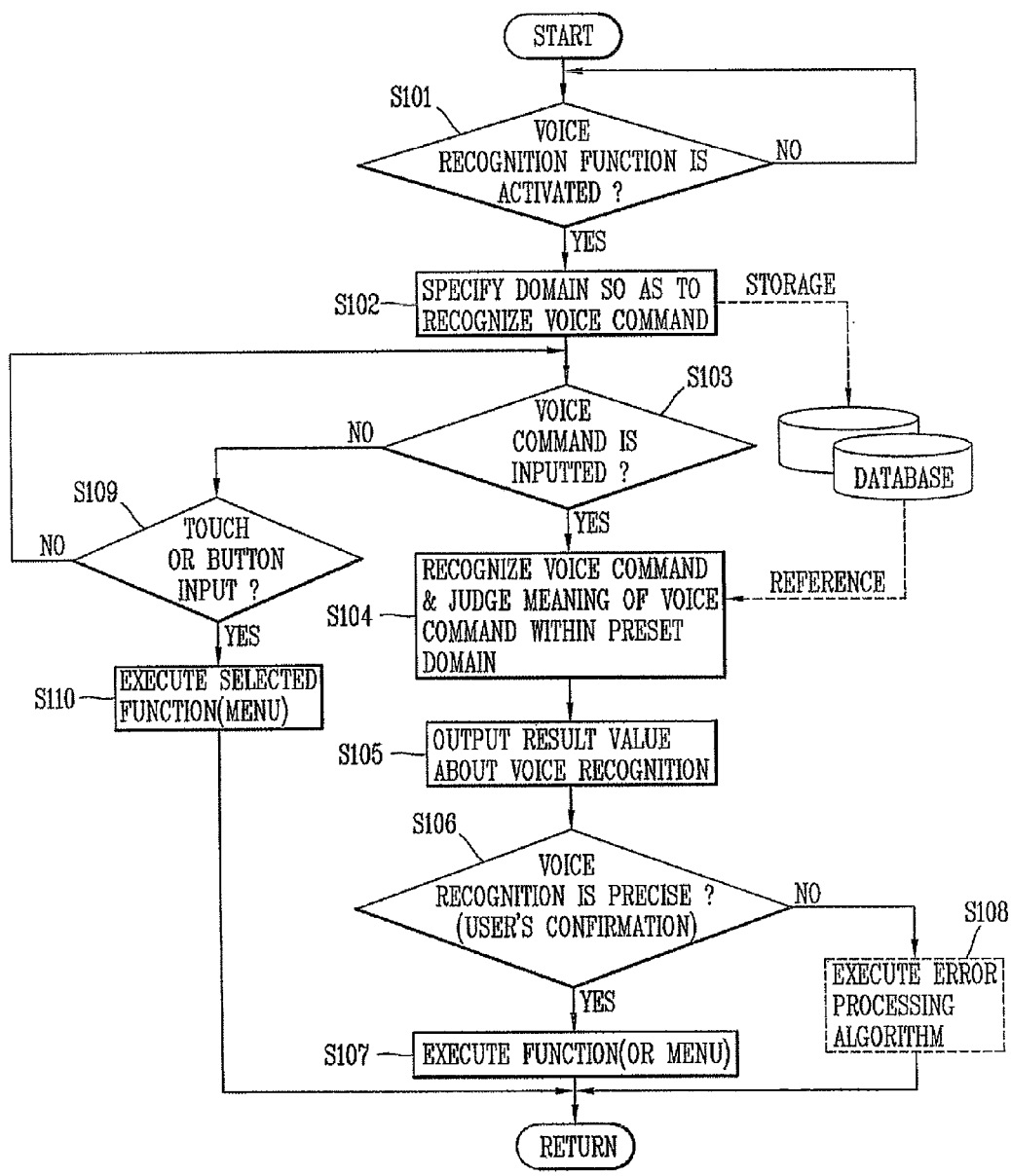
FIG. 3 is a flowchart explaining a method of controlling menu using a user's voice in a mobile terminal associated with an example of the present invention.

FIG. 3 is a flow chart illustrating the process of a method for controlling a menu of the mobile terminal by using a voice according to an embodiment of the present invention. The controller 180 of the mobile terminal may start activation of the voice recognition function upon receiving an activation control signal (S101). The activation control signal may be used to terminate the activated voice recognition function.

The activation control signal may be generated by manipulating a particular hardware button provided in the terminal, a software button displayed on the display unit 151, by applying a touch, or by manipulating a particular menu displayed on the display unit 151. Or, the activation control signal may be generated by a particular sound, a short distance radio signal or a remote radio signal, or even by human body movement information including a motion of the hand or gesture of the user.

The particular sound may include a sort of impact sound of a particular level or higher such as clapping sound. The sound of the particular level or higher can be detected by using a simple sound level detection algorithm (not shown).

The sound level detection algorithm may be relatively simple compared with a voice recognition algorithm, consuming a smaller amount of resources of the terminal. The sound level detection algorithm (or circuit) may be configured separately from the voice recognition algorithm (or circuit), or may be implemented to restrict a partial function of the voice recognition algorithm.

The radio signal may be received via the wireless communication unit 110, and the user's motion of hand or gesture may be received via the sensing unit 140. The wireless communication unit 110 for receiving the activation control signal, the user input unit 130, and the sensing unit 140 may be collectively called a signal input unit.

When the voice recognition function is activated, the controller analyzes context or content of voice data or a voice instruction received via the microphone 122 with reference to a particular database, to determine the meaning of the voice instruction (S103, S104).

Here, as the voice recognition function is activated, an information domain of the database referred to recognize the meaning of the voice instruction may be specified to information related to a particular function or menu (S102). For example, the specified information domain may be specified to information related to menus currently outputted on the display unit 151 or information related to sub-menus of a particular menu selected from the menus. Because the information domain of the database to be referred to recognize the voice instruction is specified, a recognition rate of the voice instruction can be further increased.

The information related to the sub-menus may be configured as a database.

The information may have a key word form, and a plurality of information may correspond to one function or one menu. A plurality of databases may be configured according to the characteristics of information and may be stored in the memory 160. The information configured in each database may be updated through learning. In addition, in order to improve the recognition rate of the voice instruction, the information of each database may be specified to information related to a currently outputted function or menus. The information domain may be changed as the depth of menus is increased.

The operation for determining the meaning of the voice instruction may be started immediately when the activated voice recognition function is terminated after the inputted voice instruction is temporarily stored, or may be performed simultaneously when a voice instruction is inputted in a state that the voice recognition function is activated.

Meanwhile, although the voice recognition function is in an active state, the controller may continuously drives an algorithm for detecting a touch or a button input. Thus, even in the state that the voice recognition function is activated, the controller 180 can select or execute a particular menu via any other input unit such as a touch or a button than the voice instruction (S109, S110).

When the meaning of the voice instruction is determined, the controller 180 may output the corresponding result (S105). The result may include a control signal for executing a menu related to a function or a service corresponding to the meaning of the voice instruction or controlling a particular element of the terminal, or data displaying information related to the recognized voice instruction.

When the result is outputted or executed, the controller 180 may receive a user's configuration as to whether or not the result is correct (S106). For example, if the voice instruction has a low recognition rate or recognized to have a plurality of meanings, the controller 180 outputs a plurality of menus related to each meaning, and execute them according to a user selection. Or, the controller may simply inquire whether to execute a particular menu with a high recognition rate, and execute or display a corresponding function or menu according to a user selection or response.

Whether to execute the particular menu may be confirmed to the user by outputting a message or a voice (e.g., want to execute a text message creation function? Please say Yes or No. With no response, text message creation function will be executed automatically in five seconds).

Accordingly, the user may respond (e.g., 1 Yes, 2 No) by using a voice or other input units, and the other input unit may include a hardware button or a software button, or in a touch. If there is no response from the user, the controller 180 may determine it as a positive response and automatically execute the function or menu (S107).

If the user's response is negative, namely, if the meaning of the voice instruction is not accurately determined, an error processing process may be performed (S108).

In the error processing process, the voice instruction is received again or a plurality of menus (or a plurality of menus interpreted to have a similar meaning) of a particular recognition rate or higher are displayed, and then, one of them may be selected by the user. If the number of functions or menus having the particular recognition rate or higher is smaller than a particular number (e.g., two), the function or the menu may be automatically executed.

Figure 4A:
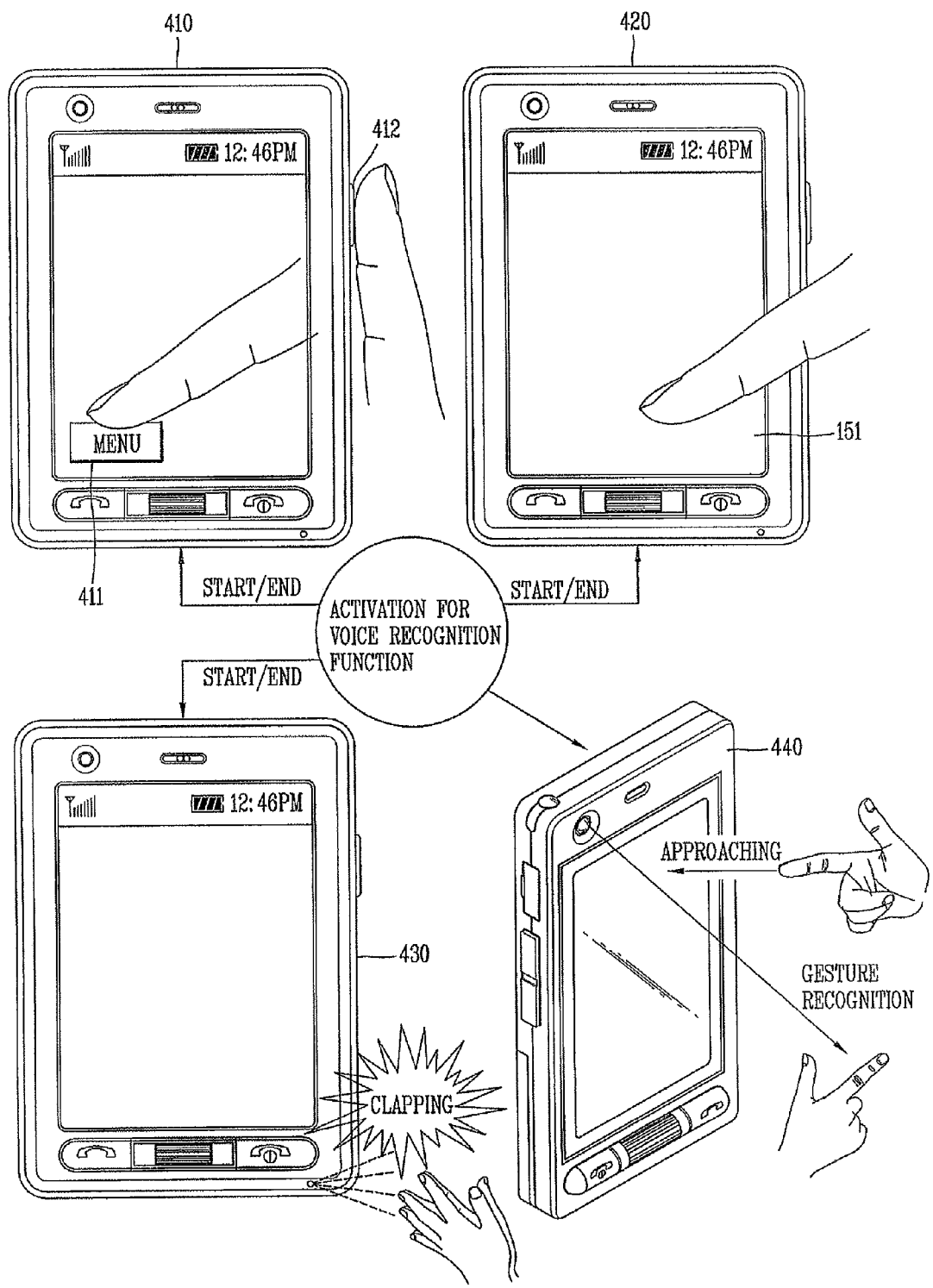
FIG. 4A is an exemplary view explaining a method of activating a voice recognition function in a mobile terminal associated with the present invention.

FIG. 4A is an overview of display screens illustrating a method for activating a voice recognition function of the mobile terminal according to an embodiment of the present invention.

When the voice recognition function is maintained in the activated state, the voice recognition algorithm is continuously driven, increasing the resource and power consumption. Thus, in order to reduce unnecessary power or resource consumption of the mobile terminal, the start or termination of the activation of the voice recognition function should be controlled. In the present invention, an arbitrary button of the user input unit 130 may be received to control the activation (411).

The arbitrary button may be a hardware button, or a software button or an icon (411) displayed on the display unit 151. The software button includes a menu call button in a standby state. Namely, when the menu call button is inputted in the standby state, the controller 180 may activate the voice recognition function while outputting a menu list.

In addition, if an arbitrary region of the display unit 151 where nothing is displayed (i.e., a region where a button or a menu icon is not displayed) is touched, the activation of the voice recognition function may be controller (420).

If a sound of a particular level or higher is inputted, the controller 180 may control activation of the voice recognition function (430). For example, the voice recognition function may be driven in two types of modes. Namely, the voice recognition function may be driven in a first mode in which a sound of the particular level or higher is simply detected, and a second mode in which a voice instruction is recognized and its meaning is determined. When a sound of a particular level or higher is inputted in the first mode, the second mode may be activated to recognize the voice instruction.

The activation of the voice recognition function may be controlled when a short-distance or remote radio signal or body movement information including the user's motion of hand or gesture is inputted (440).

As the voice recognition function is activated, the controller 180 may specify the information domain of a particular database that can be referred to for a voice recognition to information related to a menu list displayed on the display unit 151. If a particular menu is selected from the menu list or executed, the information domain of the database may be specified to information related to the selected menu or its sub-menus.

Figure 4B:
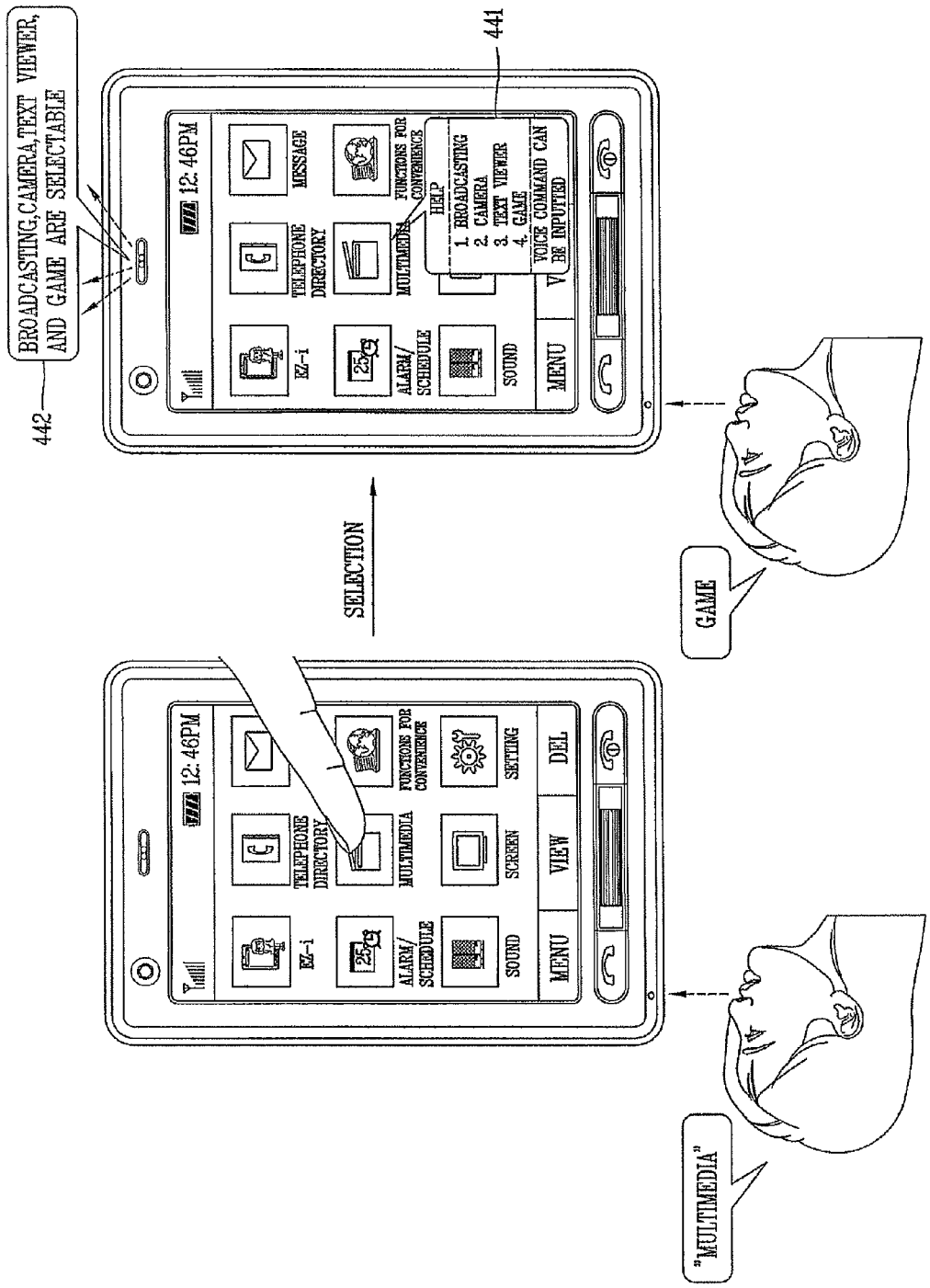
FIGS. 4B and 4C are exemplary views explaining a method of outputting help information in a mobile terminal associated with the present invention.
Figure 4C:
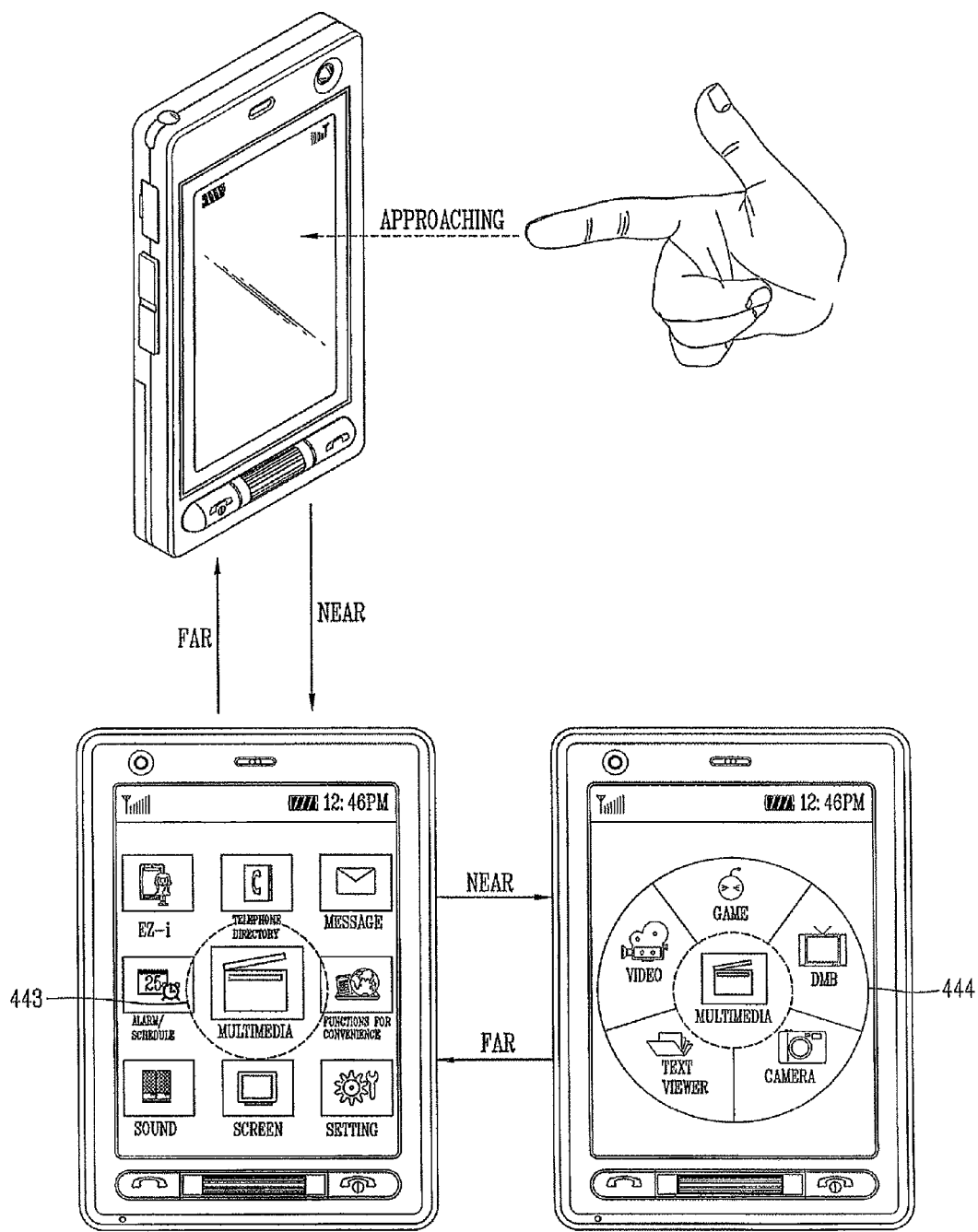

When the particular menu is selected or executed according to a voice instruction or a touch input, the controller 180 may output help information related to the sub-menus by voice or in the form of balloon help. For example, as shown in FIG. 4B, when a 'multimedia menu' is selected, information related to its sub-menus (e.g., broadcast, camera, text viewer, game, etc.) may be outputted as help information (441, 442). Or, as shown in FIG. 4C, when a user's finger approaches a particular menu 443 to select a particular menu, a sub-menu list 444 may be outputted. The transparency or brightness of the help information may be adjusted according to an access distance when displayed on the display unit 151.

After the activated state is maintained for a certain time, the controller may automatically terminate the activated state. In addition, the controller 180 may maintain the activated state only while a particular button or a touch is being inputted, and when the input is released, the controller 180 may terminate the activated state. Also, if a voice is not inputted for a certain time or longer after the activated state starts, the controller may automatically terminate the activated state.

Figure 5A:
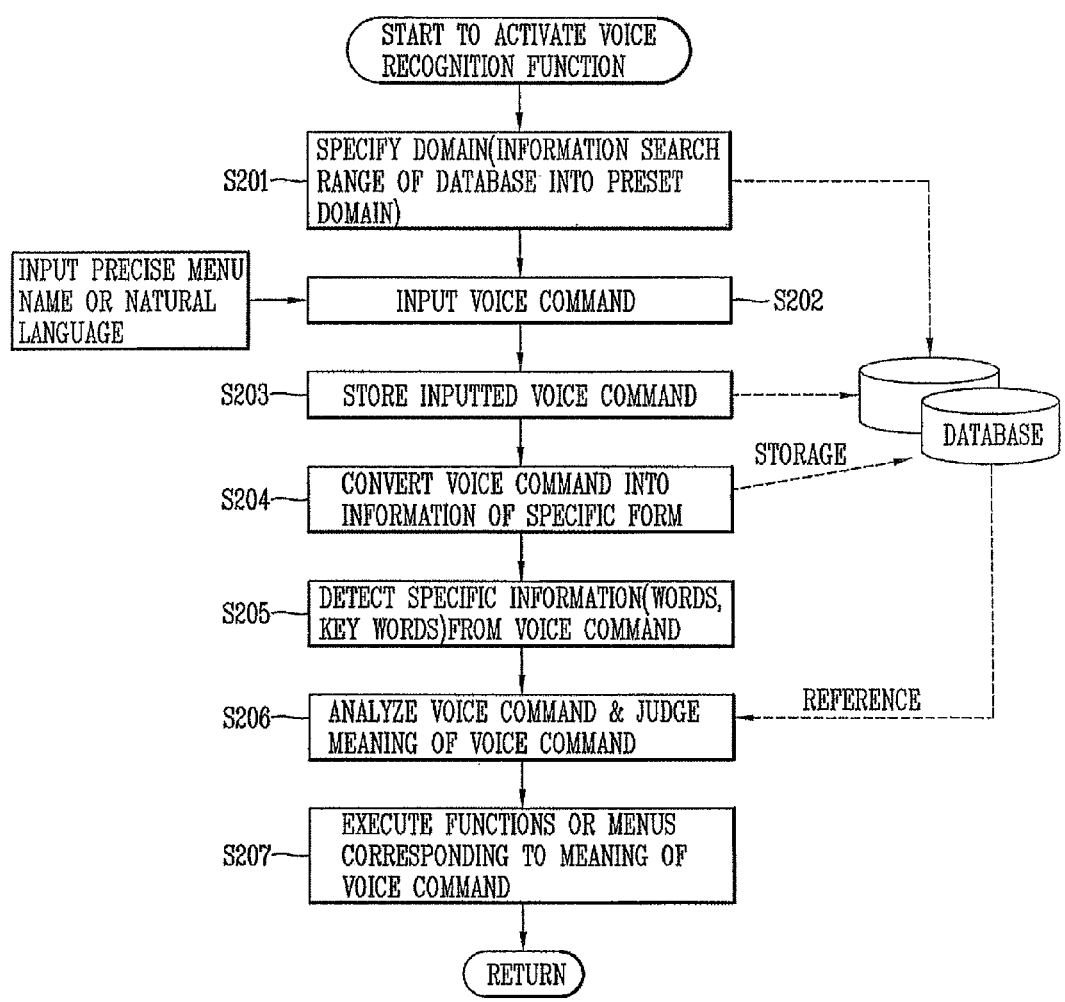
FIG. 5A is a flowchart explaining a method of recognizing a voice command in a mobile terminal associated with the present invention.

FIG. 5A is a flow chart illustrating the process of a method for recognizing a voice instruction of the mobile terminal according to an embodiment of the present invention.

As the voice recognition function is activated, the controller 180 may specify an information domain that can be referred to for a voice recognition to information related to menus displayed on the display unit 151, its sub-menus, or a currently executed function or menu (S201). A voice instruction received after the voice recognition function is activated may be stored in a particular database of the memory 160 (S202, S203).

When the voice instruction is received in the state that the information domain is specified, the controller 180 analyzes content and context of the voice instruction within the specified information domain of the database by using the voice recognition algorithm. In order to analyze the voice instruction, the voice instruction may be converted into text-type information, and the text-type information may be stored in a particular database of the memory 160 (S204). However, the voice instruction may not be necessarily converted into the text-type information.

In order to analyze the content and context, the controller 180 may detect a particular word or a key word included in the voice instruction (S205). The controller 180 may analyze content or context of the voice instruction and determining its meaning with reference to the information stored in the particular database based on the detected word or key word (S206). The information domain of the referred database may be specified to a information domain related to a currently executed function or menu, and a function or a menu corresponding to the meaning of the voice instruction determined with reference to the database may be executed (S207).

For example, on the assumption that the text message creation function is executed and then text is inputted by using the STT function, priority of the information domain for recognizing the voice instruction may be set to be instructions related to correction of the text or instructions related to searching the other party for a message transmission or related to transmission of a message. Because the information domain for a voice recognition is specified to the information related to the particular menus, the speed and recognition rate of the voice recognition can be improved and consumption of resources can be reduced.

The recognition rate may refer to a degree consistent to the name set in a particular menu. The recognition rate of the voice instruction may be determined by the number of pieces of information related to a particular function or menu among the information included in the voice instruction. Thus, the recognition rate of the voice instruction may be high if information precisely consistent to a particular function or menu is included in the voice instruction.

Figure 5B:
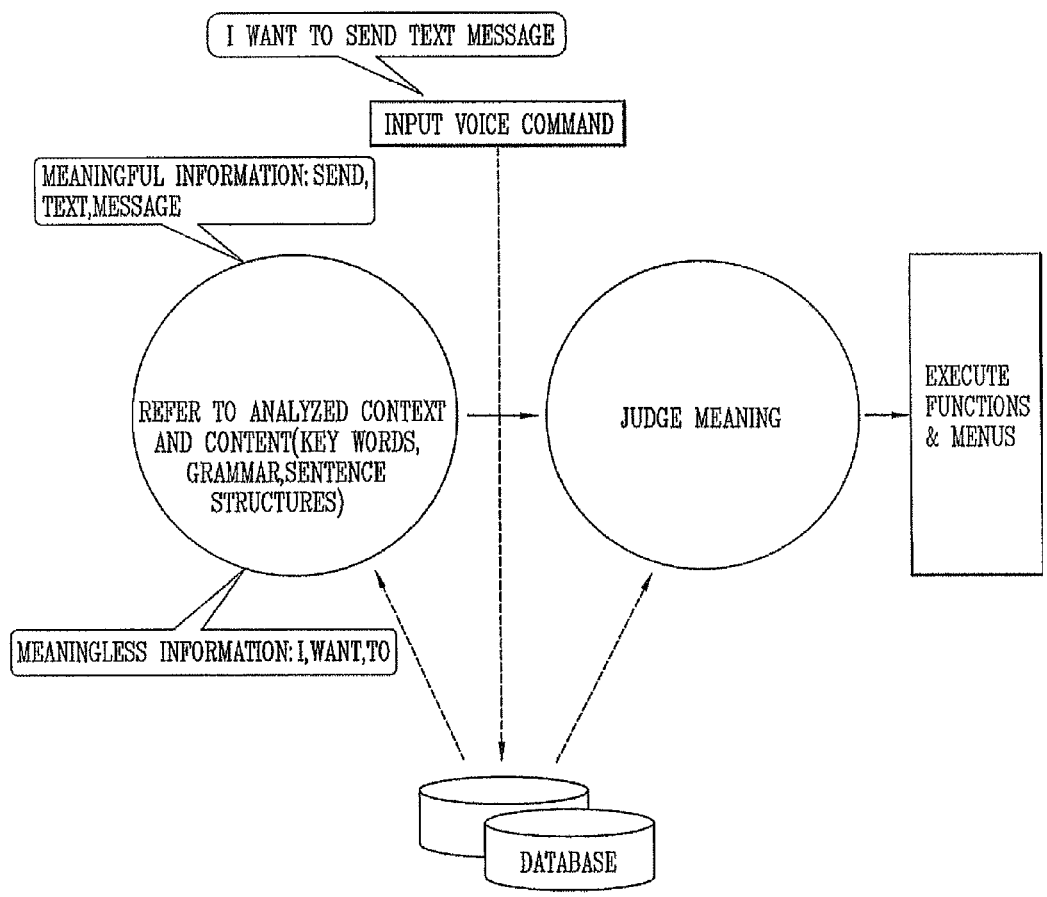
FIG. 5B is an exemplary view explaining a method of recognizing a voice in a mobile terminal associated with the present invention.

For example, as shown in FIG. 5B, if the voice instruction in a natural language including six words (e.g., I want to send text message) is inputted, its recognition rate may be determined by the number of the meaningful words (e.g., 'send', 'text', 'message') related to a particular menu (e.g., text message). Whether or not the words included in the voice instruction are related to a particular function or menu may differ according to the information stored in the database. For example, In the voice instruction in the natural language (e.g., I want to send text message), meaningless words unrelated to the menu may be grammatically the subject (I) or the preposition (to).

Here, the natural language is a language generally used by people in daily life, which is discriminated from an artificial language which is artificially created, and can be processed by using a natural language processing algorithm. The natural language may or may not include an accurate name related to the particular menu, so it may be difficult to precisely recognize a voice instruction 100% virtually. Accordingly, if the recognition rate is higher than a particular value (e.g., 80%), it can be considered to be accurate. If there are a plurality of meanings having such recognition rate (namely, if a voice instruction that can be interpreted by several meanings each with similar recognition rate is inputted), corresponding menus are displayed and at least one function or menu may be executed according to a user selection.

Figure 6:
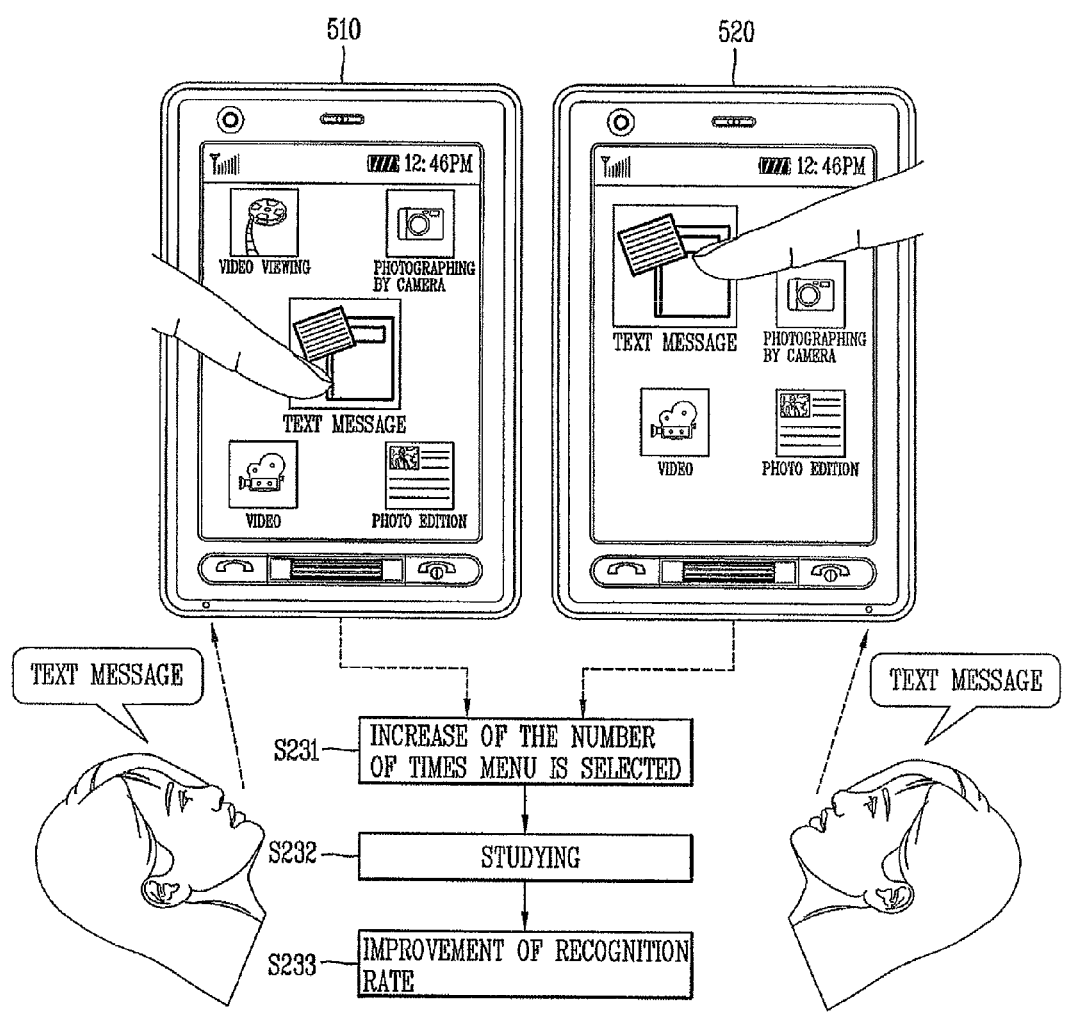
FIG. 6 is a exemplary view explaining a method for displaying a menu based on a voice recognition rate in a mobile terminal associated with the present invention.

In displaying the menus, the menus may be displayed in the order starting from a menu with the highest recognition rate. For example, as shown in FIG. 6, a menu icon having the highest recognition rate may be displayed to be closer to the center of the screen (510). Or, the menu icon having the highest recognition rate may be displayed to be larger or darker (520). Or, at least one of a size, a position, a color and a contrast of the plurality of menus may be differently displayed according to the order starting from the menu having the highest rate, or highlighted, or their transparency may be adjusted.

The recognition rate of a menu having a higher selection by the user among the plurality of displayed menus may be changed to be higher. Namely, as for the recognition rate, if a menu is frequently selected by the user, the number of its selections may be learned, and a recognition rate with respect to the selected menu may be changed. Thus, a recognition rate of a voice instruction inputted with the same or similar pronunciation or content afterwards may be changed.

Figure 7:
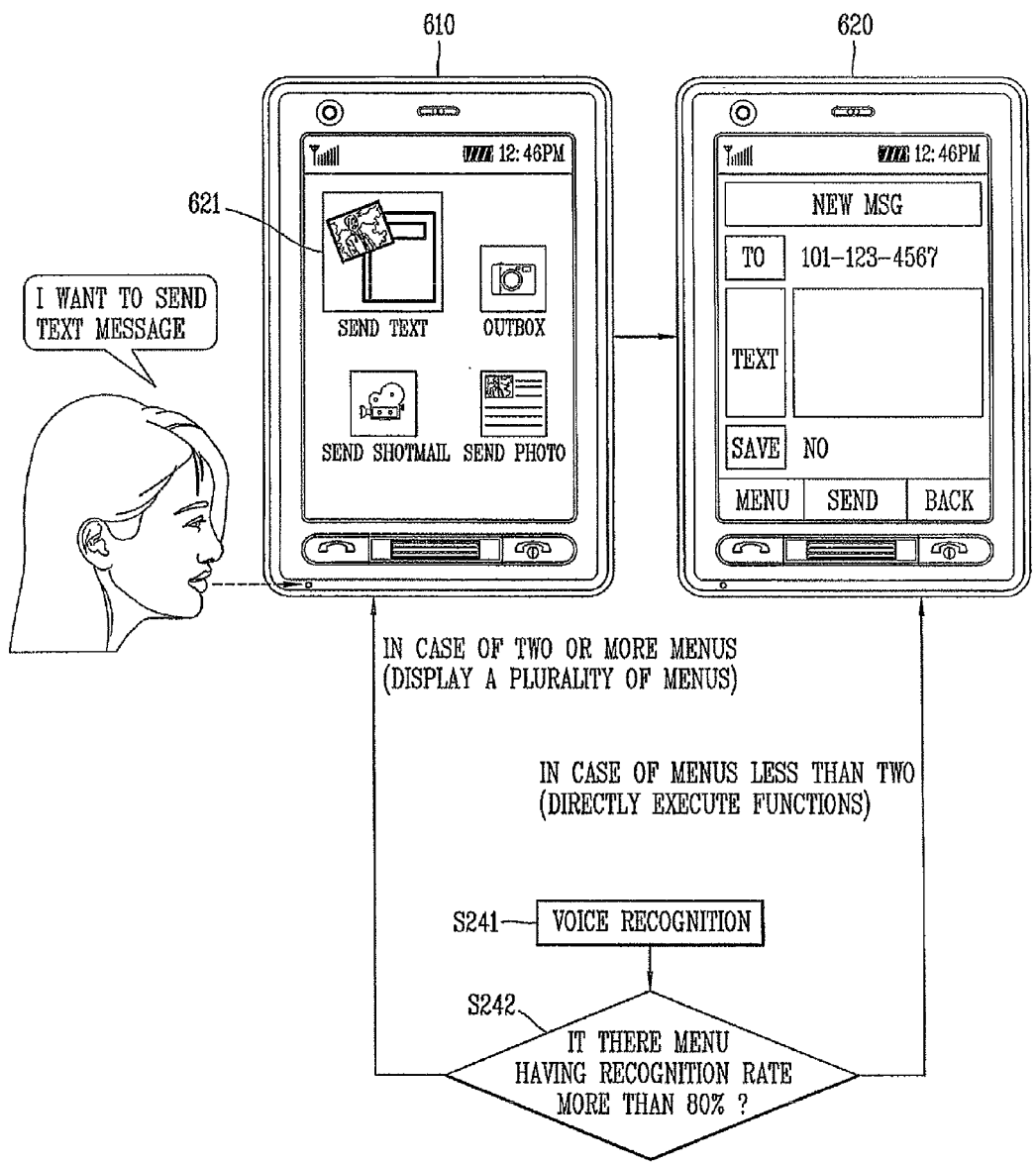
FIG. 7 is an exemplary view explaining a method of recognizing a voice command in a mobile terminal associated with the present invention.

FIG. 7 is an overview of display screens illustrating a voice instruction recognition method of the mobile terminal according to an embodiment of the present invention.

On the assumption that the mobile terminal is in a standby state and a particular menu (e.g., message) is selected by the user in the standby state, the controller 180 displays sub-menus of the selected menu. And then, the controller 180 starts activating of the voice recognition function internally. As the voice recognition function starts to be activated, the controller 180 may set an information domain of the database for recognizing the voice instruction by specifying it to information related to the displayed sub-menus (610) according to a pre-set environment setting option.

With the sub-menus displayed, the controller 180 may receive a voice instruction, a touch or a button from the user and select a particular menu 621. When the particular menu 621 is selected, the controller 180 may display the sub-menus (620).

With the sub-menu displayed (620), when the voice instruction in natural language (e.g., I want to send text message) is inputted, the controller 180 detects meaningful words or keywords (e.g., send, text, message) related to the particular function or menu, compares them with information related to the sub-menus in the particular database, and determines a meaning with the highest recognition rate.

And then, the controller 180 executes a menu related to the determined meaning (e.g., send text).

In addition, if a particular menu is selected or executed according to a voice instruction or a touch input, the controller 180 may output help information related to sub-menus by voice or as a balloon help in the form of text, according to an operation state or an operation mode (e.g., a mode for guiding the voice recognition function) of the terminal.

The operation mode for outputting the help may be set according to an option related to the environment setting menu. Accordingly, in the present invention, menus related to a particular function or service can be controlled by inputting a button or a touch or by a voice instruction regardless of how the user is familiar or skilled with respect to the voice instruction.

Meanwhile, when the voice instruction is recognized with a plurality of meanings, namely, if the voice instruction in natural language does not include an accurate name of a menu, e.g., if a menu desired to be selected by a user from among 'send photo', 'send shotmail' and 'outbox' is not accurately determined, the controller 180 may display a plurality of menus having a recognition rate of a particular value (e.g., 80%) or higher. However, if menus of the particular value or higher is smaller than two, a corresponding function or menu may be automatically executed.

Figure 8:
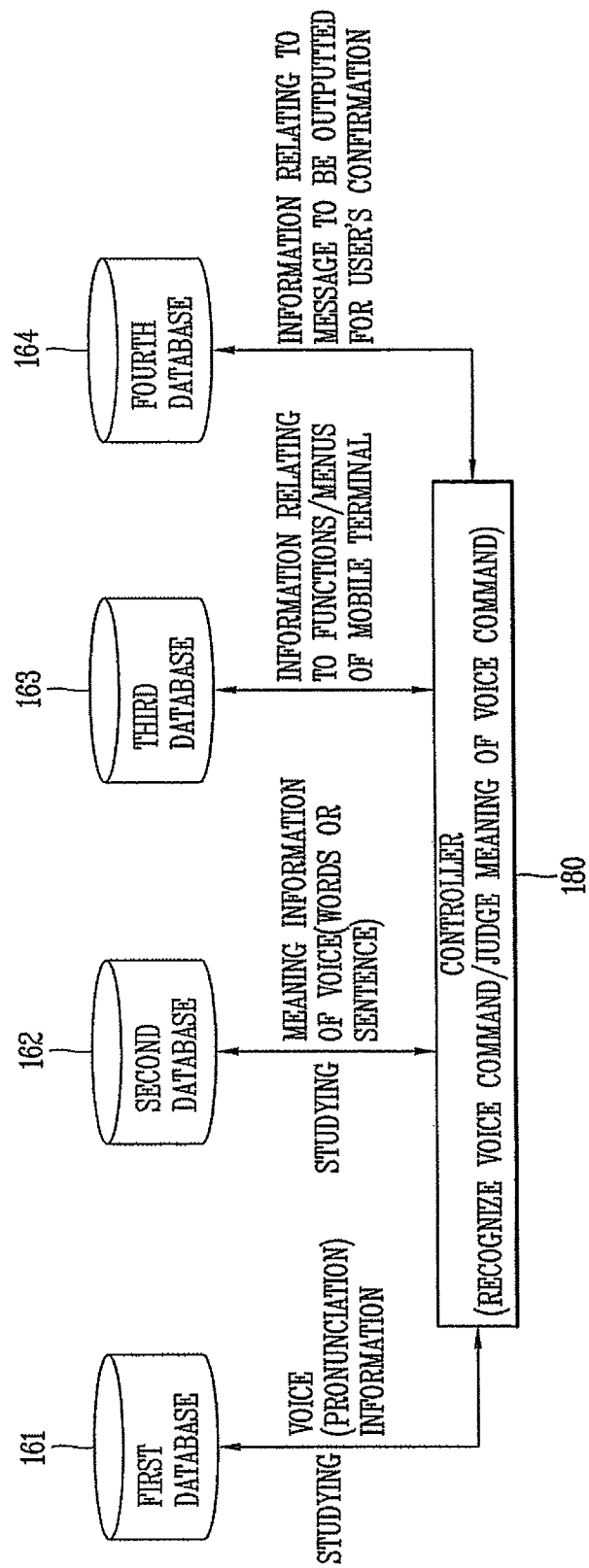
FIG. 8 is an exemplary view explaining a database for recognizing a voice command in a mobile terminal associated with the present invention.

FIG. 8 is a block diagram illustrating a database system used in a voice recognition method of the mobile terminal according to an embodiment of the present invention.

The database stores information for determining the meaning of the voice instruction, and a plurality of databases may be configured according to the characteristics of the information. Information of each database configured according to the characteristics of information may be updated through a continuous learning process under the control of the controller 180.

The learning process for the databases refers to matching a voice pronounced by the user to a corresponding word. For example, if the user has pronounced 'waiting' but it is recognized as 'eighteen', the user may correct 'eighteen' into 'waiting', so that the controller 180 recognizes the same pronunciation made afterwards as 'waiting'. Through such learning process, a plurality of voice information may be matched to each information of the databases.

For example, the databases may include a first database 161 for storing voice information allowing the user's voice input through the microphone to be recognized by format, syllable, or morpheme, a second database 162 for storing information (e.g., grammar, accuracy of pronunciation, sentence structure) allowing the controller 180 to determine the overall meaning of a voice instruction based on the recognized voice information, a third database 163 for storing information related to a menu for performing a function or a service of the mobile terminal, and a fourth database 164 for storing a message or voice information to be output from the mobile terminal for user's acknowledgement with respect to a meaning of the determined voice instruction.

The third database 163 may specify information related to menus of a particular category according to an information domain set for recognizing the above-described voice instruction. Each database may store voice (pronunciation) information or format, syllable, morpheme, a word, a keyword, or sentence information corresponding to the voice (pronunciation) information.

Accordingly, the controller 180 can determine the meaning of the voice instruction by using at least one of the plurality of databases 161 to 164, and execute a menu related to a function or service corresponding to the determined meaning of the voice instruction. In addition, in the present invention, an operation state or an operation mode in which the voice instruction recognition function or the SST function is applied can be displayed by using an indicator or an icon or a particular shape. When the indicator or the icon is outputted, a particular sound or voice may be outputted for user's information.

The present invention may further include databases (not shown) in which terms and conversations information (for example, accumulated conversations with a particular party) frequently used in a particular situation (for example, appointment, travel, business trip, traffic, meal, reservation, place, time, shopping, etc.) in addition to the foregoing database. Moreover, according to the present invention, the information may be divided into categories and stored as a database without providing a plurality of databases.

The controller 180 may restrict the scope of voice recognition (in other words, information scope of a particular database for voice recognition or information scope of a particular category for voice recognition) by providing databases (or information divided by each category) divided by various situations or topics as described above. The controller 180 may enhance the rate of voice recognition by narrowly restricting the scope of voice recognition as described above. In other words, the enhancement in the rate of voice recognition means that voices can be recognized more correctly for a shorter period of time.

In particular, according to the present invention, it is possible not only to recognize the pronunciation (or voice) of the user but also to recognize the meaning of a sentence inputted in a natural language. Furthermore, it may be possible to enhance the rate of voice recognition for a voice to be inputted next by restricting the scope of voice recognition using the recognized context information as described above.

Figure 9A:
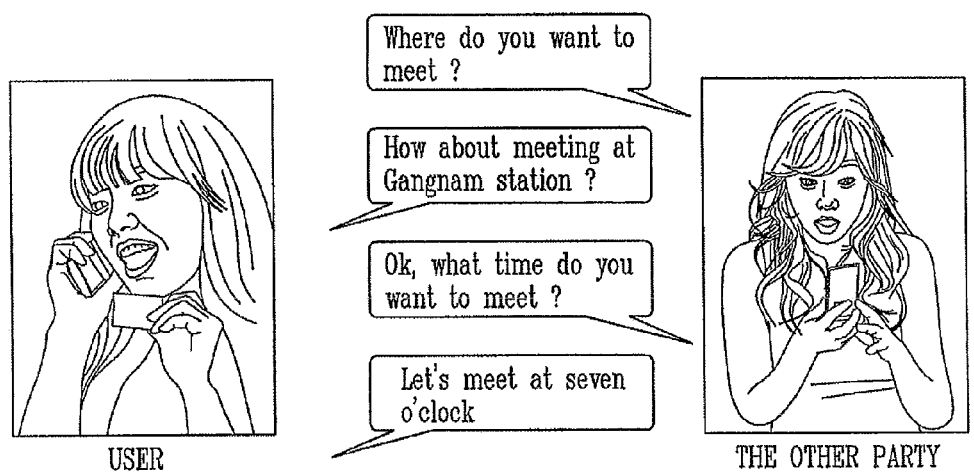
FIGS. 9A through 9C are exemplary views explaining a method of recognizing a voice in a mobile terminal associated with the present invention.
Figure 9B:
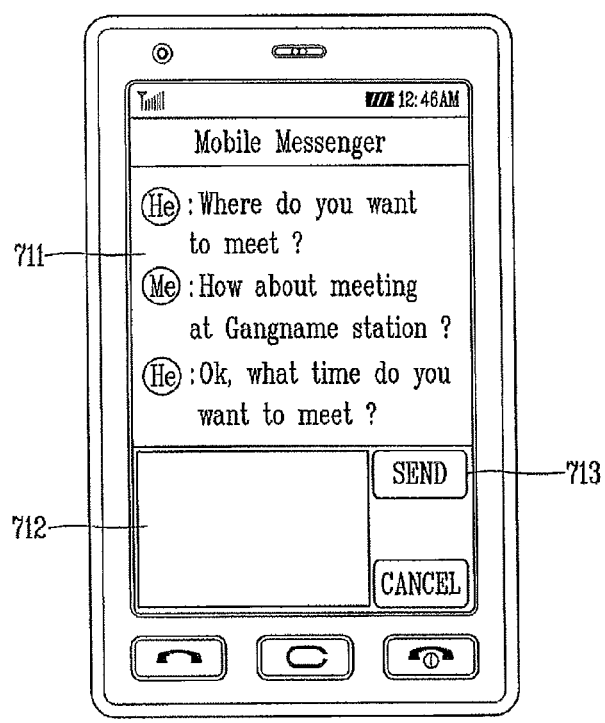
Figure 9C:
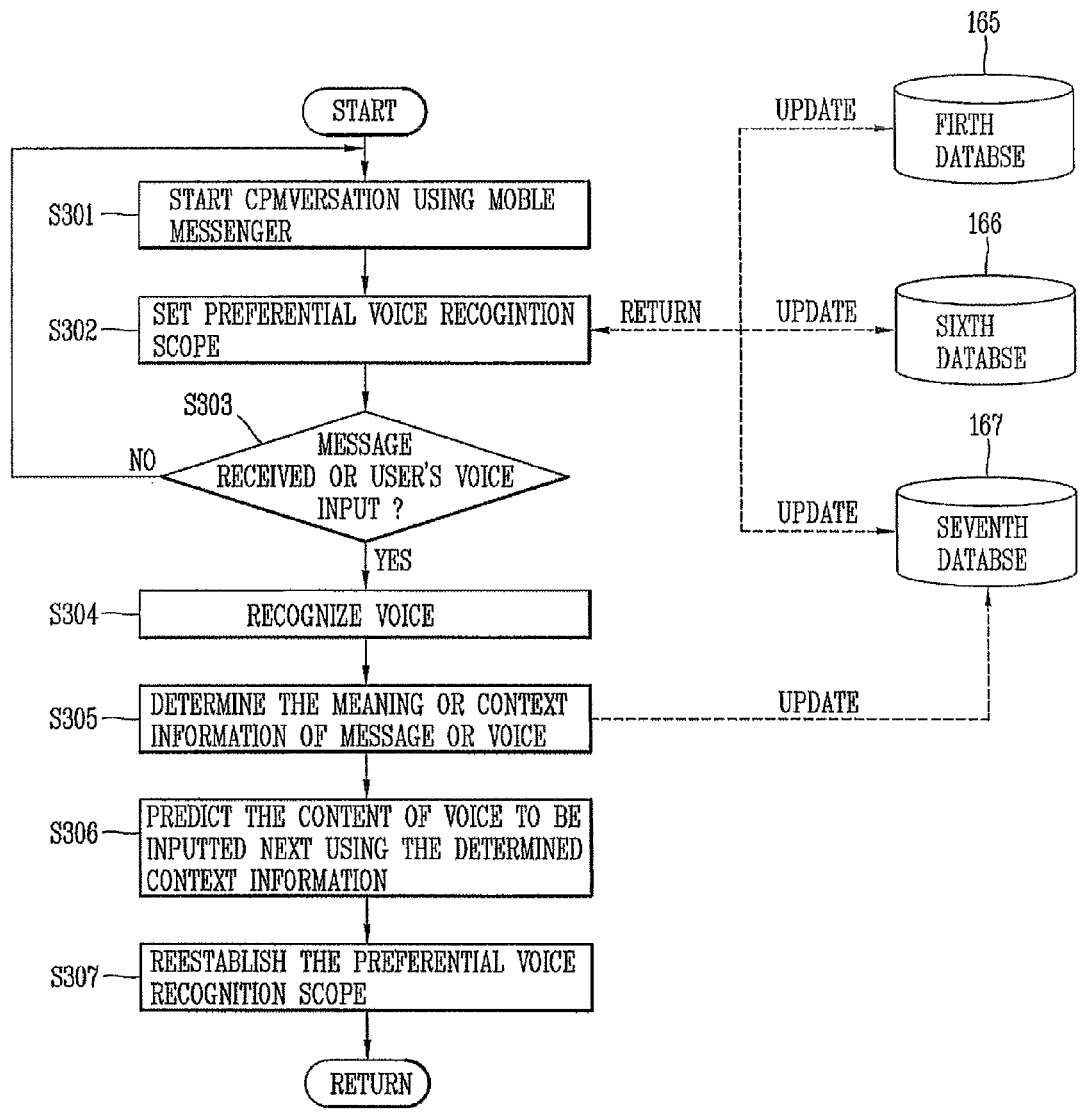

FIGS. 9A through 9C are exemplary views explaining a method of recognizing a voice in a mobile terminal associated with the present invention.

As illustrated in FIG. 9A, it is assumed that the user and an arbitrary party converse each other on a particular category (for example, appointment place, appointment time) using a mobile messenger of the mobile terminal while driving (or moving).

For a short message, typically, sent and received messages are displayed separately. However, as illustrated in FIG. 9B, the mobile messenger 711 sequentially displays messages sent and/or received to and/or from the other party on a screen 711 (for example, send/receive message display window), thereby allowing the user to collectively view conversation content according to the order at a time.

The mobile messenger may include a screen 711 for collectively displaying send and receive messages, a screen 712 for inputting the content of send message, and a send button 713 instructing to send the inputted message. According to the present invention, if the content of a message to be sent by the user is inputted with voice, then the controller 180 converts the voice into a text to display on the text input screen 712 (for example, message input window).

The text message with the foregoing messenger form has an advantage of maintaining the continuity of conversation. In other words, it has an advantage that the user can view text messages being conversed with a particular party on a screen, and collectively view the content related to each other by storing and managing it in a file.

As illustrated in FIG. 9C, when the user starts conversation using a mobile messenger (S301), the controller 180 may set a "preferential voice recognition scope" using conversation content accumulated when the user converses with a particular party, relation information with a group (for example, group of a phone book) to which the other party belongs or the user (for example, friend, customer, family, club member, etc.) (S302). The "preferential voice recognition scope" means a particular database (or information category) which is preferentially referred to for voice recognition.

For example, the scope of voice recognition may be set to the relevant category (for example, appointment related category) if there are many sentences related to place and time in the accumulated conversation content, and the "preferential voice recognition scope" may be set to a category related to business if the group to which the other party belongs is a client group.

Here, a plurality of categories (or databases) may be set at the same time for the "preferential voice recognition scope." For example, "appointment category" and "friend category" may be set at the same time, and "traffic category" and "reservation category" may be set at the same time, and moreover, another particular category may be set additionally.

If a message is received or a user's voice is inputted in a state that the "preferential voice recognition scope" is set as described above (Yes of step S303), then the controller 180 performs a voice recognition preferentially in the set "preferential voice recognition scope" (S304). In other words, the meaning or context information of the received message or the voice inputted by the user is determined (S305).

Then, in case that the voice recognition cannot be made within the "preferential voice recognition scope," the scope of voice recognition may be gradually expanded based on an arbitrary preset method.

Then, if the voice recognition is performed as described above, then the controller 180 converts the recognized content into a text and sends to the other party. Then, the content of the sent message is displayed on a screen 711 in a messenger form.

As described above, the controller 180 may grasp the meaning or context information of conversation content and predict the content to be inputted next (S306). For example, when it is grasped that context information of the conversation content is related to "appointment," it has high probability that a voice to be inputted next may be a specific time if the meaning of the previously inputted voice was a question on appointment time. Accordingly, the subsequent "preferential voice recognition scope" may increase a weighting value for the time, thereby enhancing the rate of voice recognition. In addition, it may be possible to complete a simple sentence using the meaning or context information of the previously inputted sentence (for example, the sentence received as a text message from the other party or sentence received as a voice from the other party). For example, in case that the user simply says "seven" in response to a question of the other party "What time do you want to meet?", the controller 180 may automatically complete a sentence like "Let's meet at seven o'clock." Furthermore, the automatically completed sentence (=text message) may be displayed on the messenger screen to get the user's confirmation. If the automatically completed sentence is confirmed by the user, then the sentence will be sent to the other party.

Furthermore, as the foregoing conversation continues the controller 180 may reestablish the "preferential voice recognition scope" (S307). Furthermore, a voice recognition is performed by reflecting the reestablished "preferential voice recognition scope."

In other words, the "preferential voice recognition scope" may be reestablished, added or changed by the controller 180 base on the determined context information. In other words, even if the "preferential voice recognition scope" is established based on the other party, it may be reestablished, added or changed to the "preferential voice recognition scope" suitable for the conversation situation by the controller 180 as the currently on-going conversation (for example, text message received from the other party, or text message sent by converting the user's inputted voice into a text) continues.

Figure 10:
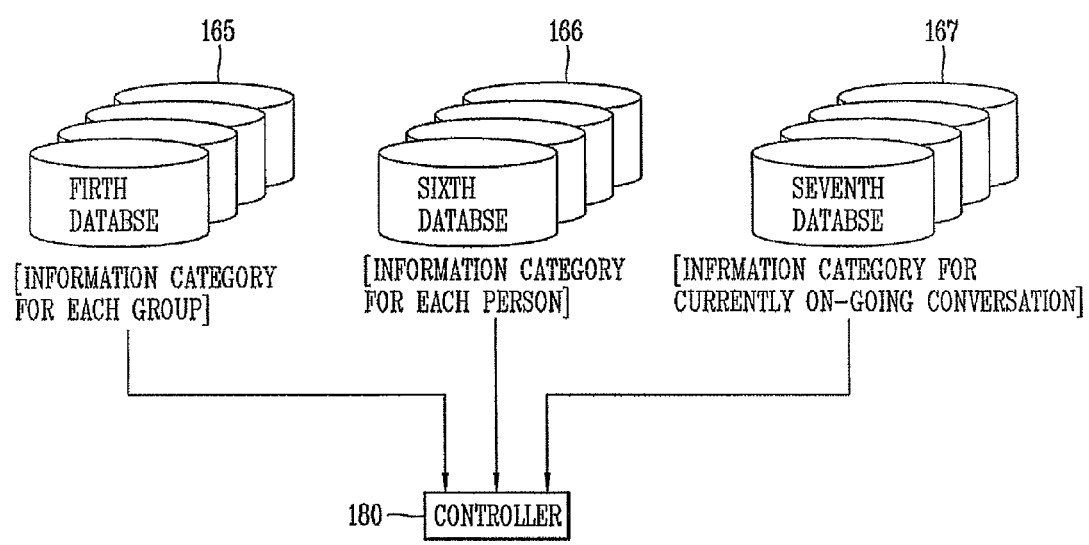
FIG. 10 is an exemplary view explaining a database for recognizing a voice in a mobile terminal associated with the present invention.

FIG. 10 is an exemplary view explaining a database for recognizing a voice in a mobile terminal associated with the present invention.

Typically, the content being conversed with the user is different based on the group stored in a phone book of the mobile terminal. For example, there is a difference between the content being conversed with families and the content being conversed with fellow workers or friends. Accordingly, the relevant "preferential voice recognition scope" may be established based on the group including the other party to be conversed with the user, thereby enhancing the rate of voice recognition.

The present invention may further include a new database (or information category) for voice recognition modeling in addition to the foregoing database (or information category). For example, the database may include a fifth database 165 configured with topic information of the mainly used language and conversation for each group (for example, friend, customer, family, fellow worker, club member, etc.) stored in a phone book of the mobile terminal, a sixth database 166 configured with topic information of the mainly used language and conversation using the content that has been conversed for each person, and a seventh database 167 configured with currently on-going conversation content in a messenger form.

Furthermore, as the conversation with the other party is progressed, the information of the fifth through the seventh databases may be updated.

Here, the controller 180 may perform a voice recognition using the content being conversed just prior to inputting a new voice (for example, question just prior to the answer), or the timely-adjacent content being continuously conversed (for example, content being conversed in an interval within 3 minutes) by using the seventh database.

The controller 180 may drive a voice recognition engine using the foregoing databases. The voice recognition engine may be implemented using a software algorithm or may be implemented using a hardware chipset. Otherwise, the controller itself 180 may be driven as a voice recognition engine.

Figure 11A:
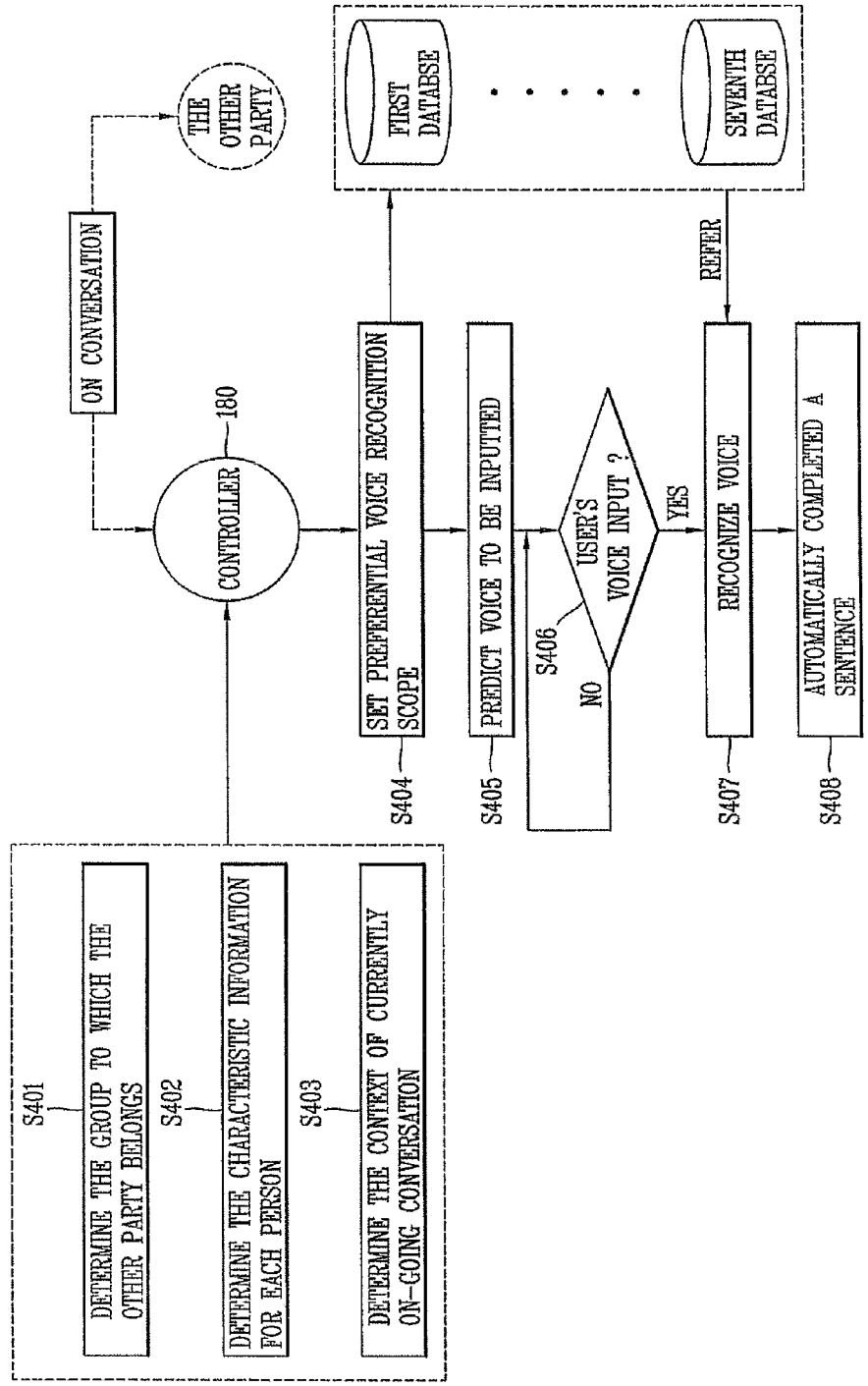
FIGS. 11A and 11B are exemplary views explaining a method of setting a "preferential voice recognition scope" in a mobile terminal associated with the present invention.
Figure 11B:
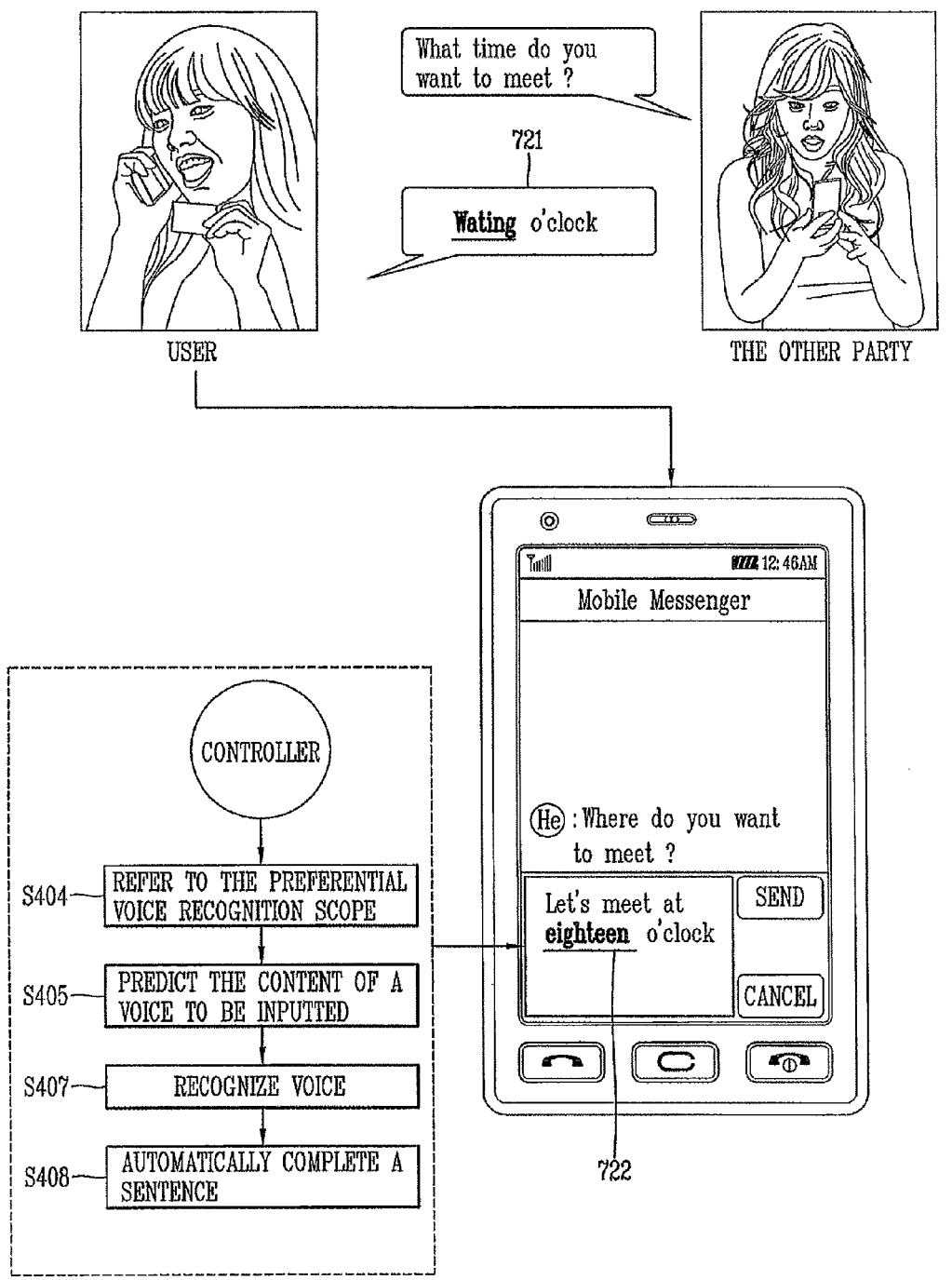

FIGS. 11A and 11B are exemplary views explaining a method of setting a "preferential voice recognition scope" in a mobile terminal associated with the present invention.

As described above, the "preferential voice recognition scope" means the information scope of a database (or information category) preferentially referred to, compared to other databases, for voice recognition more correctly for a shorter period of time.

The "preferential voice recognition scope" may be automatically established in the controller 180 based on the conversation situation. For example, when a message is arrived to the user from the other party, or when a message is sent from the user to the other party, the controller 180 determines the group of a phone book registered in the user's mobile terminal by referring to the other party's sender information (S401). Then, a database (for example, fifth database) related to the determined group of the phone book may be set as a "preferential voice recognition scope" (S404).

Furthermore, the controller 180 may further establish a database (for example, sixth database) stored with personal characteristic information (for example, conversation style, type of main conversation, etc.) as a "preferential voice recognition scope" (S402, S404).

In addition, the controller 180 may further establish a database (for example, seventh database) for being referred to when storing messages being conversed with each other in real time from the time when starting the conversation with the other party in a messenger form, and determining or analyzing the context information of currently on-going conversation using the stored conversation content (S403, S404).

The controller 180 may predicts the content of a voice to be inputted by the user by restricting the "preferential voice recognition scope" to the databases related to the other party currently conversing with. In other words, the user can predict the meaning or context of the content to be inputted with the user's voice (S405). For example, assuming that a conversation about making an appointment is currently being progressed, the style of the conversation (for example, polite words, familiar words, or plain words) may be determined based on the group to which the other party belongs (for example, friend, customer, family, fellow worker, etc.), and the next question or answer to be inputted by the user may be predicted based on the context from currently on-going conversation content (for example, question and answer).

Accordingly, if the other party has asked a question related to appointment time (for example, "What time?"), then the controller 180 may predict that the user will give an answer related to appointment time. Then, when a voice (for example, answer) is inputted by the user (Yes of step S406), the voice can be recognized as an answer (for example, waiting, eighteen) having a similar pronunciation in the database (or information category) related to appointment time even if the user's pronunciation is not correct (S407). For example, as illustrated in FIG. 11B, in case that an incorrect pronunciation 721 similar to "waiting o'clock" is made at the time when the user should answer an appointment time for the other party's question asking appointment time, the controller 180 correctly recognizes it as "eighteen o'clock" and displays an automatically completed sentence 722 on the screen.

The foregoing restriction of the "preferential voice recognition scope" is not intended to restrict the voice recognition to be implemented only within the restricted information scope, but intended to implement a correct voice recognition according to the conversation situation even if a somewhat incorrect pronunciation is inputted by the user.

On the other hand, when a voice is inputted by the user in a state that the "preferential voice recognition scope" is set as described above, the controller 180 preferentially performs a voice recognition within the established "preferential voice recognition scope," and thereby, the rate of the user's voice recognition can be enhanced but also it may be used to automatically complete a sentence (S408).

Hereinafter, the foregoing automatic sentence completion method will be described.

Figure 12:
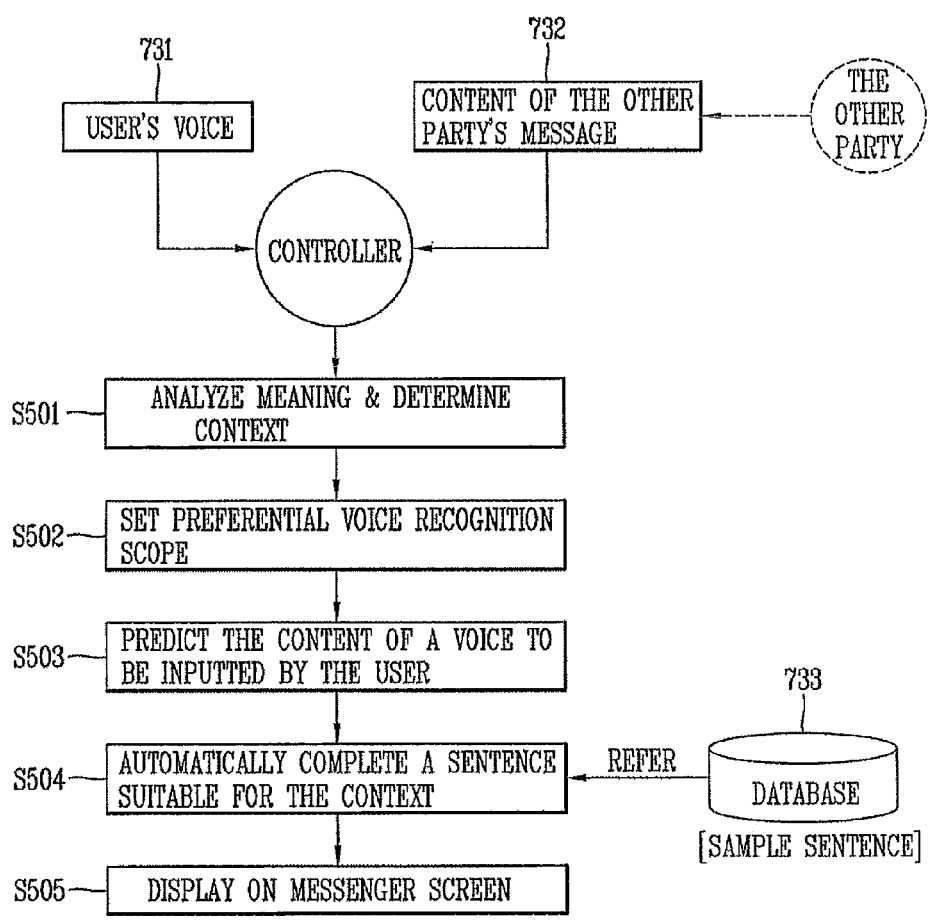
FIG. 12 is an exemplary view explaining a method of automatically completing a sentence in a mobile terminal associated with the present invention.

FIG. 12 is an exemplary view explaining a method of automatically completing a sentence in a mobile terminal associated with the present invention.

A voice recognition method according to the present invention is not merely provided to convert the user's voice into a text, and means to recognize even the meaning and context information included in the user's voice thereby performing the relevant operation.

Here, the context information is information indicating a connection relation or flow of the meaning expressed in the previous or subsequent sentences. For example, people conversing with one another talk about the same topic, and therefore, it may be said that the context is continuous. However, when the previous and subsequent sentences are not connected with the same topic, it may be said that the context is broken.

According to the present invention, the controller 180 can determine not only the meaning and context included in a voice 731 spoken by the user, but also the meaning and context in a message 732 received from the other party. Accordingly, the controller 180 can determine the context of the conversation (or flow of the conversation) while the conversation is made in a messenger form (S501).

For example, when receiving a message (for example, "where do you want to meet?") asking for a place to meet from the other party, the controller 180 determines the meaning or context information of the message. In other words, the controller 180 determines that the meaning or context information of the message is related to "meeting," "place," and "appointment.". Accordingly, the "preferential voice recognition scope" can be set to a database (or category) stored with the related information (S502). Then, it can be predicted that the user will input an answer for "meeting," "place," or "appointment" (S503).

Then, when receiving a message (for example, "what time do you want to meet?") asking for a time to meet from the other party again, the controller 180 determines the meaning or context information of the message. In other words, the controller 180 determines that the meaning or context information of the message is related to "meeting," "place," and "appointment.". Accordingly, the "preferential voice recognition scope" can be set to a database (or category) stored with the related information (S502). Then, it can be predicted that the user will input an answer for "meeting," "place," or "appointment" (S503).

Then, when an answer (for example, eighteen) is inputted by the user, the controller 180 can automatically complete a sentence (for example, "Let's meet at eighteen o'clock") to be sent to the other party by referring to the determined context information, the answer inputted by the user, and sample sentences stored in a particular database 733 (S504). For example, fundamental type sentences (for example, sample sentences for each conversation situation) may be stored in advance in the particular database 733 to automatically complete a sentence as described above. As a result, the controller 180 may complete a sentence in a method of inserting a voice inputted by the user (for example, appointment time, appointment place, name of the other party, etc.) into an appropriate preset location in the sample sentence. The sentence may be changed to another type of sentence according to the other party's style of the conversation determined by the controller 180.

Subsequent to automatically completing a sentence as described above, the controller 180 may display the completed sentence on the messenger screen (S505). Accordingly, the user may confirm the sentence displayed on the messenger screen and then enter a send button.

As described above, preferred embodiments of the present invention have been described with reference to the accompanying drawings.

Here, the terms and words used herein and the claims should not be construed by limiting to their typical or lexical meaning, but should be construed based on the meaning and concept conforming to the technical spirit of the present invention.

Accordingly, the configuration illustrated in the embodiments disclosed herein and the drawings is merely the most preferred embodiment of the present invention, and is not intended to represent all the technical spirit of the present invention, and thereby it should be appreciated that there may exist various equivalents and modifications for substituting those at the time of filing this application.

What is claimed is:

1. A method of controlling a mobile terminal, the method comprising:
   displaying on a screen of the mobile terminal a thread of messages communicated between the mobile terminal and a terminal of an other party during a messenger session, wherein the thread of messages comprises at least one message transmitted from the mobile terminal to the terminal of the other party and at least one message transmitted from the terminal of the other party to the mobile terminal;
   setting a preferential voice recognition scope based on information related to the other party;
   generating a first database based on the thread of messages while the messenger session is going on, wherein at least one previous exchange between the mobile terminal and the another party is stored as a second database;
   extracting context information among the first database, wherein the context information is related to contents of the thread of messages;
   changing the preferential voice recognition scope among the first database and the second database based on the context information;
   receiving a voice input by the mobile terminal via a microphone of the mobile terminal after the preferential voice recognition scope is changed;
   converting the received voice input into a message based on the changed preferential voice recognition scope;
   generating a sentence included in the converted voice input based on the context information and the changed preferential voice recognition scope;
   displaying the sentence on the screen; and
   transmitting the sentence to the terminal of the other party in response to an input thereof.

2. The method of controlling the mobile terminal of claim 1, wherein the generating the sentence comprises:
   selecting a sentence from a number of sample sentences which is stored in a third database, wherein the third database is set based on the context information and the converted voice and the changed preferential voice recognition; and
   inserting the converted voice input into the sentence to form the sentence.

3. The method of controlling the mobile terminal of claim 1, wherein the first database is updated in real time based on a change in the thread of messages, and the second database is updated based on an additional exchange between the mobile terminal and the other party.

4. The method of claim 1, wherein the displaying the thread of messages comprises sequentially displaying at least one message transmitted by the mobile terminal and at least one message received from the terminal of the other party.

5. The method of claim 1, wherein the converting the voice input into the message is performed further based on a relationship between a user of the mobile terminal and the other party.

6. The method of claim 5, wherein the relationship is determined by using information of the other party stored in a phonebook of the mobile terminal.

7. A mobile terminal, the terminal comprising:
   a microphone for inputting a user's voice;
   a display unit for displaying a mobile messenger; and
   a controller coupled to the microphone and the display unit and the controller configured to:
   display on the display unit a thread of messages communicated between the mobile terminal and a terminal of an other party during a messenger session, wherein the thread of messages comprises at least one message transmitted from the mobile terminal to the terminal of the other party and at least one message transmitted from the terminal of the other party to the mobile terminal;
   set a preferential voice recognition scope based on information related to the other party;
   generate a first database based on the thread of messages while the messenger session is going on, wherein at least one previous exchange between the mobile terminal and the another party is stored as a second database;
   extract context information among the first database, wherein the context information is related to contents of the thread of messages;
   change the preferential voice recognition scope among the first database and the second database based on the context information;
   receive a voice input by the mobile terminal via a microphone of the mobile terminal after the preferential voice recognition scope is changed;
   convert the received voice input into a message based on the changed preferential voice recognition scope;
   generate a sentence included in the converted voice input based on the context information;

display the sentence on the display unit and the changed preferential voice recognition scope; and transmit the sentence to the terminal of the other party in response to an input thereof.

8. The mobile terminal of claim 7, wherein the controller selects the sentence from a number of sample sentences which is stored in a third database, wherein the third database is set based on the context information and the changed preferential voice recognition scope, and inserts the converted voice input into the sentence to form the sentence.

9. The mobile terminal of claim 7, wherein the first database is updated in real time based on a change in the thread of messages, and the second database is updated based on an additional exchange between the mobile terminal and the other party.

10. The mobile terminal of claim 7, wherein the thread of messages comprises at least one message transmitted by the mobile terminal and at least one message received from the terminal of the other party in temporal order.

11. The mobile terminal of claim 7, wherein the voice input is converted into the message further based on a relationship between a user of the mobile terminal and the other party.

12. The mobile terminal of claim 11, wherein the relationship is determined by using information of the other party stored in a phonebook of the mobile terminal.

* * * * *